(12) United States Patent
Raghupathy et al.

(10) Patent No.: US 9,787,649 B2
(45) Date of Patent: Oct. 10, 2017

(54) SYSTEMS AND METHODS FOR PROVIDING CONDITIONAL ACCESS TO TRANSMITTED INFORMATION

(71) Applicant: NextNav, LLC, Sunnyvale, CA (US)

(72) Inventors: Arun Raghupathy, Bangalore (IN); Subramanian S. Meiyappan, San Jose, CA (US); Deepak Joseph, Oakton, VA (US); Varaprasad Vajjhala, San Ramon, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 14/991,940

(22) Filed: Jan. 9, 2016

(65) Prior Publication Data

US 2016/0127329 A1    May 5, 2016

Related U.S. Application Data

(63) Continuation of application No. 14/023,427, filed on Sep. 10, 2013, now Pat. No. 9,286,490, and a
(Continued)

(51) Int. Cl.
| | |
|---|---|
| *H04K 1/00* | (2006.01) |
| *H04L 9/00* | (2006.01) |
| *H04L 29/06* | (2006.01) |
| *G06F 21/62* | (2013.01) |
| *H04W 4/02* | (2009.01) |

(Continued)

(52) U.S. Cl.
CPC ........ *H04L 63/0428* (2013.01); *G06F 21/629* (2013.01); *G06F 21/6245* (2013.01); *H04W 4/02* (2013.01); *H04W 12/08* (2013.01); *G06F 2221/2111* (2013.01); *G06F 2221/2113* (2013.01); *H04L 29/08657* (2013.01);
(Continued)

(58) Field of Classification Search
CPC ........... H04L 63/0428; H04L 29/08657; H04L 63/123; H04L 63/105; H04L 63/08; H04W 12/08; H04W 4/02; G06F 21/629; G06F 21/6245; G06F 2221/2113; G06F 2221/2111
USPC ................................. 380/270, 277; 713/165
See application file for complete search history.

(56) References Cited

U.S. PATENT DOCUMENTS

| | | | |
|---|---|---|---|
| 9,286,490 B2* | 3/2016 | Raghupathy | ........ G06F 21/6245 |
| 2001/0055392 A1 | 12/2001 | McDonnell | |

(Continued)

FOREIGN PATENT DOCUMENTS

| | | |
|---|---|---|
| CN | 102263637 A | 11/2011 |
| CN | 102263637 B | 3/2015 |

OTHER PUBLICATIONS

Australian Patent Office, Patent Examination Report No. 1, Australian Patent Application No. 2013315642, 3 pages, dated Jul. 20, 2016.
(Continued)

*Primary Examiner* — Aravind Moorthy

(57) ABSTRACT

Controlling access to position information at a receiver, or at another device external to the receiver. Various considerations, including a requested service type, a user type, a device type, a software application type, a payment, and/or other characteristics associated with a particular software application or distributor of that software application, may be used to control access to position information.

42 Claims, 15 Drawing Sheets

Related U.S. Application Data continuation of application No. 14/010,437, filed on Aug. 26, 2013, now Pat. No. 9,390,279.

(60) Provisional application No. 61/699,800, filed on Sep. 11, 2012.

(51) Int. Cl.
*H04W 12/08* (2009.01)
*H04L 29/08* (2006.01)

(52) U.S. Cl.
CPC ............ *H04L 63/08* (2013.01); *H04L 63/105* (2013.01); *H04L 63/123* (2013.01)

(56) References Cited

U.S. PATENT DOCUMENTS

| | | | | |
|---|---|---|---|---|
| 2006/0046744 A1* | 3/2006 | Dublish | ............. | H04L 63/0442 455/456.3 |
| 2006/0195401 A1* | 8/2006 | Davis | ..................... | G06F 21/33 705/50 |
| 2007/0086593 A1* | 4/2007 | Denning | ............. | H04L 63/0428 380/286 |
| 2008/0080712 A1* | 4/2008 | Huang | ................... | G01S 19/13 380/258 |
| 2008/0246659 A1* | 10/2008 | Brenner | ................. | G01S 19/37 342/357.72 |
| 2009/0103722 A1* | 4/2009 | Anderson | ............. | H04L 9/0841 380/44 |
| 2012/0050033 A1* | 3/2012 | Westen | ................. | G01S 5/0027 340/539.13 |
| 2013/0145160 A1* | 6/2013 | Bursell | ............... | G06F 21/6218 713/168 |
| 2014/0006787 A1* | 1/2014 | Measson | ............... | H04W 12/04 713/171 |

OTHER PUBLICATIONS

Chinese Patent Office, Office Action for Chinese Patent Application No. 201380046918.3, including rough English translation of certain sections of the Office Action, 13 pages, dated Mar. 21, 2017.

Applicant, Response to Patent Examination Report No. 1, Australian Patent Application No. 2013315642, 13 pages, dated Aug. 25, 2016.

Applicant, Response to Office Action for Chinese Patent Application No. 201380046918.3, including rough English translation of suggested amendments to claims and suggested remarks for foreign counsel, 27 pages, dated Jul. 6, 2017.

* cited by examiner

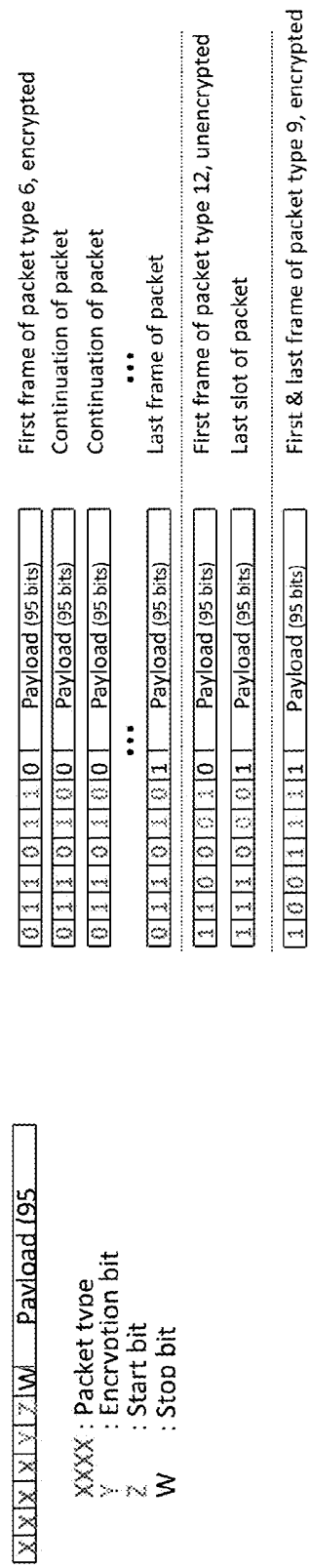

SYSTEMS AND METHODS FOR PROVIDING CONDITIONAL ACCESS TO TRANSMITTED INFORMATION

FIELD

This disclosure relates to wireless communications, and more particularly, to the disclosure relates to systems and methods for controlling access to position information.

BACKGROUND

Systems for providing position information are known in the art. For example, radio-based systems such as LORAN, GPS, GLONASS, and the like have been used to provide position information for persons, vehicles, equipment, and the like. These systems do, however, have limitations associated with factors such as location accuracy, transmitted and received signal levels, radio channel interference and/or channel problems such as multipath, device power consumption, and the like.

Determination of a mobile subscriber's exact location can be quite challenging. If the subscriber is indoors or in an urban area with obstructions, the subscriber's mobile device may not be able to receive signals from GPS satellites and the network may be forced to rely on network-based triangulation/multilateration methods that are less precise. Additionally, if the subscriber is in a multi-story building, knowing only that the subscriber is in the building and not what floor they are on, will result in delays in providing emergency assistance (which could be potentially life-threatening). Clearly, a system that can assist the subscriber's computing device (e.g., a mobile computing device) in speeding up the location determination process, provide more accuracy (including vertical information), and solve some of the challenges of location determination in urban areas and inside buildings is needed.

Moreover, position information transmitted in systems like GPS is readily available to various devices without any option to regulate which device may have access to the position information, or more particularly, which software application on the device may use the position information. Such lack of regulation may place bandwidth burdens on network operators where many applications across many devices are transmitting position information through the network to third party services that are associated with those applications. Having an ability to regulate use of position information would further allow network operators to maintain better levels of service for its customers while reducing unnecessary bandwidth use. Moreover, providing greater control to network operators would permit per monetization at the application level or service level for each user device or each user of a user device. Accordingly, there is a need for improved positioning systems to address these and/or other problems with existing positioning systems and devices.

SUMMARY

In accordance with the present disclosure, systems, methods and computer program products comprising a computer usable medium having a computer readable program code embodied therein that is adapted to be executed to implement a method for providing conditional access to position information for a computing device are described. For example, certain aspects of this disclosure relate to a system, method, computer program product and means for controlling access to position information by one or more applications. The system, method, computer program product and means may decrypt, using a first key, a first set of encrypted position signals received from a network of terrestrial transmitters. The system, method, computer program product and means may further determine position information from the first set of decrypted position signals, and identify a first set of the position information, where the first set of the position information is identified based on a first level of service associated with a first application. The system, method, computer program product and means may further encrypt the first set of the position information using a second key, and provide the encrypted first set of the position information to the first application Details of embodiments are set forth in the drawings and the description below.

BRIEF DESCRIPTION OF THE DRAWINGS

The present application may be more fully appreciated in connection with the following detailed description taken in conjunction with the accompanying drawings.

FIG. 9 illustrates types of data for use during a conditional access process.

FIG. 10A illustrates a packet structure.

FIG. 10B illustrates a series of bits for use in accordance with certain aspects.

DETAILED DESCRIPTION

Figure 1:
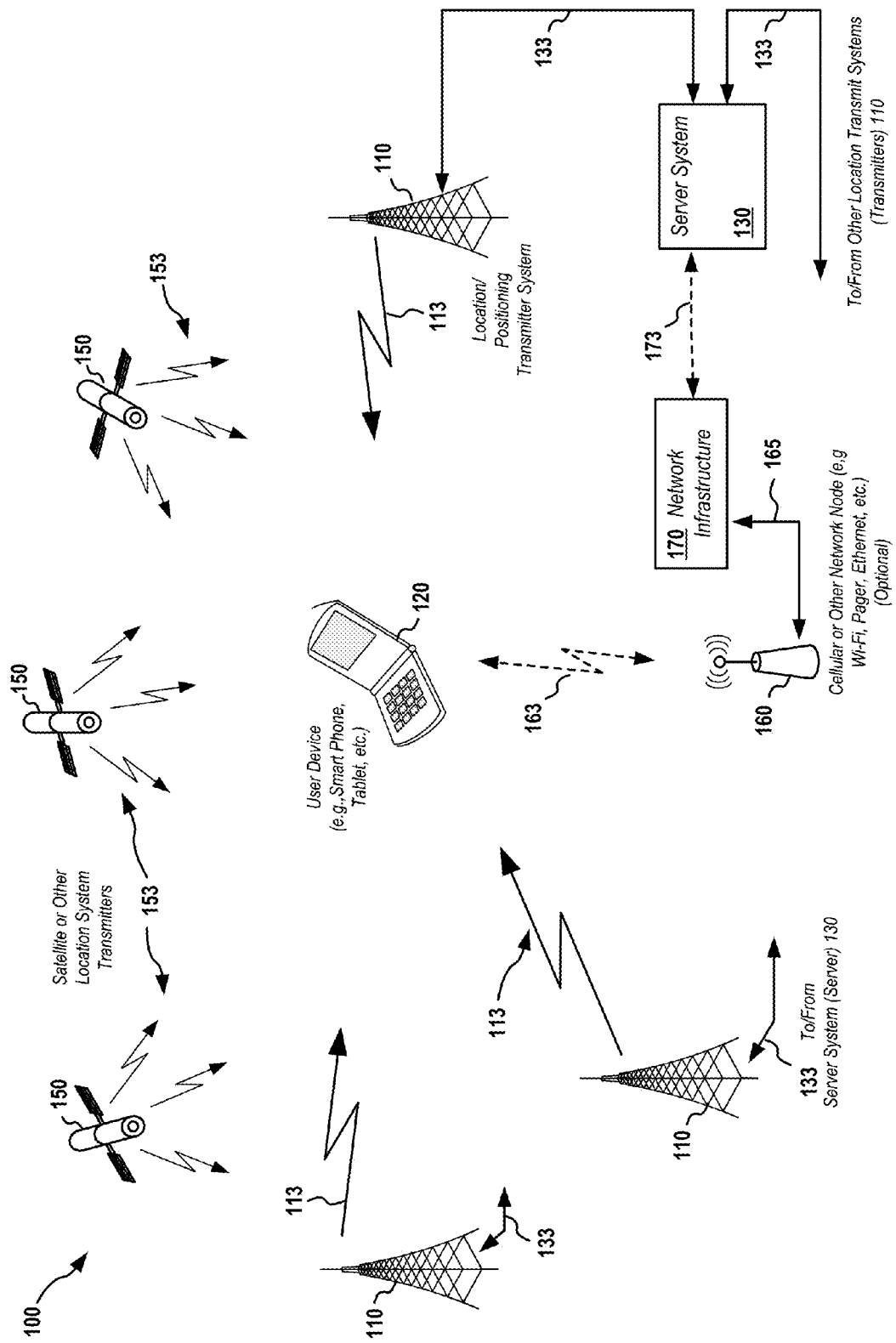
FIG. 1 depicts a diagram illustrating details of a terrestrial location/positioning system on which embodiments may be implemented.

Various aspects of the disclosure are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein.

As used herein, the term "exemplary" means serving as an example, instance or illustration. Any aspect and/or embodiment described herein as "exemplary" is not necessarily to be construed as preferred or advantageous over other aspects and/or embodiments.

Overview

This disclosure relates generally to positioning systems and methods for providing signaling for position determination and determining high accuracy position/location information using a wide area transmitter array in communication with receivers (also interchangeably referred to herein as user devices, user terminals/UEs, or similar terms) such as in cellular phones or other portable devices. Positioning signaling services associated with certain aspects may utilize broadcast-only beacons/transmitters that are configured to transmit encrypted positioning signals. Receivers having an appropriate chipset may be able to receive and use the positioning signals based on air-link access authentication techniques, including authentication by way of decrypting the position signals using a stored copy of an air-link access certificate (ALAC) during an initial decryption stage. Once decrypted with the ALAC during the initial decryption stage, the receiver may provide, to a software application operating on the receiver, conditional access to the position information based on an additional decryption stage using an authorized service level certificate (ASLC) associated with that particular software application.

Various components within a receiver may be used to carry out the decryption stages. For example, decryption of the broadcast signal may occur at a GPS chip in conjunction with ALACs that are provisioned into firmware of a secure hardware area (e.g., in the GPS chip). By comparison, decryption of the position information using the ASLC may occur at another chip (e.g., a receiver's processor) in conjunction with an ASLC that is not provisioned in firmware (e.g., accessible via a different level of software). Of course, one of skill in the art will appreciate alternative configurations.

Once decrypted, the position information may be processed by a processor (e.g., a positioning engine) in order to compute various positioning signal data units such as Latitude, Longitude and Altitude to varying degrees of accuracy. Examples of altitude computations are provided in U.S. Utility patent application Ser. No. 13/296,067, entitled WIDE AREA POSITIONING SYSTEMS, filed Nov. 14, 2011, which is incorporated herein by reference.

The two-stage decryption of position information at the receiver offers several advantages over prior art. For instance, aspects of the two-stage decryption enable the transmitter and/or the receiver to provide positioning signals to authorized receivers and/or authorized software applications (hereafter referred to as "applications") while denying access to unauthorized receivers and unauthorized applications. Similarly, access to the position information may be controlled based on the user requesting access, or other types of considerations.

Controlling access to position information based on authorization permits a carrier and application developers to offer tiered levels of service that may be purchased based on different business agreements. Tier levels may relate to levels of accuracy, coverage areas, duration of validity, amounts of use, periods of use, or other considerations The two-stage decryption of position information at the receiver also decreases the likelihood that an unauthorized user (e.g., a hacker) can gain access to and use the positioning information, thereby causing loss of revenue.

Achievement of the above advantages must be balanced against performance requirements of the positioning system. According to certain aspects, the encryption and decryption stages performed in the system may not compromise system performance metrics such as Time to First Fix (TTFF) of a receiver's position and accuracy of any position fix. Additionally, processing associated with the various conditional access methodologies described herein may be limited based on processing power of particular receivers, which may preclude process-intensive cryptographic procedures.

According to other aspects, the conditional access feature may be available on various device platforms and may support the delivery models identified in the use cases described herein.

Other aspects may involve factory-based or consumer-based provisioning of a receiver (in addition to any re-provisioning) to support the conditional access methodologies described herein. By way of example, various provisioning embodiments are described herein.

Importantly, any of the conditional access processes described herein must comply with any E-911 functional requirements.

Various additional aspects, features, and functions are described below in conjunction with the appended Drawings. While the details of the embodiments of the disclosure may vary and still be within the scope of the claimed disclosure, one of skill in the art will appreciate that the Drawings described herein are not intended to suggest any limitation as to the scope of use or functionality of the inventive aspects. Neither should the Drawings and their description be interpreted as having any dependency or requirement relating to any one or combination of components illustrated in those Drawings.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, and the like. In other instances, well-known structures or operations are not shown, or are not described in detail, to avoid obscuring aspects of the disclosed embodiments.

System Aspects

FIG. 1 offers a diagram illustrating details of an example location/positioning system 100 on which various embodiments may be implemented. Positioning system 100, also referred to herein as a Wide Area Positioning System (WAPS), or "system" for brevity, includes a network of synchronized beacons (also denoted herein as "transmitters"), which are typically terrestrial, as well as user devices (also denoted herein as "receiver units" or "receivers" for brevity) configured to acquire and track signals provided from the beacons and/or other position signaling, such as may be provided by a satellite system such as the Global Positioning System (GPS) and/or other satellite or terrestrially based position systems. The receivers may optionally include a location computation engine to determine position/location information from signals received from the beacons and/or satellite systems, and the system 100 may further include a server system in communication with various other systems, such as the beacons, a network infrastructure, such as the Internet, cellular networks, wide or local area networks, and/or other networks. The server system may include various system-related information, such as an index of towers, a billing interface, one or more encryption algorithm processing component, which may be based on one or more proprietary encryption algorithms, a location computation engine, and/or other processing components to facilitate position, motion, and/or location determination for users of the system.

As shown in exemplary system 100, the beacons may be in the form of a plurality of transmitters 110, and the receiver units may be in the form of one or more user devices 120, which may be any of a variety of electronic communication devices configured to receive signaling from the transmitters 110, as well as optionally configured to receive GPS or other satellite system signaling, cellular signaling, Wi-Fi signaling, Wi-Max signaling, Bluetooth, Ethernet, and/or other data or information signaling as is known or developed in the art. The receiver units 120 may be in the form of a cellular or smart phone, a tablet device, a PDA, a notebook or other computer system, a digital camera, an asset tracking tag, and ankle bracelet, and/or similar or equivalent devices. In some embodiments, the receiver unit 120 may be a standalone location/positioning device configured solely or primarily to receive signals from the transmitters 110 and determine location/position based at least in part on the received signals. As described herein, receiver units 120 may also be denoted herein as "User Equipment" (UE), handsets, smart phones, tablets, and/or simply as a "receiver."

The transmitters 110 (which may also be denoted herein as "towers") are configured to send transmitter output signals to multiple receiver units 120 (a single receiver unit 120 is shown in FIG. 1 for simplicity, however, a typical system will be configured to support many receiver units within a defined coverage area) via communication links 113 as shown. The transmitters 110 may also be connected to a server system 130 via communication links 133, and/or may have other communication connections (not shown) to a network infrastructure 170, such as via wired connections, cellular data connections, Wi-Fi, Wi-Max, or other wireless connections, and the like.

One or more receivers 120 may receive signaling from multiple transmitters 110 via corresponding communication links 113 from each of the transmitters 110. In addition, as shown in FIG. 1, a receiver 120 may also be configured to receive and/or send other signals, such as, for example, cellular network signals via communication link 163 from a cellular base station (also known as a NodeB, eNB, or base station), Wi-Fi network signals, Pager network signals, or other wired or wireless connection signaling, as well as satellite signaling via satellite communication links 153, such as from a GPS or other satellite positioning system. While the satellite positioning signaling shown in the exemplary embodiment of FIG. 1 is shown as being provided from GPS system satellites 150, in other embodiments the signaling may be provided from other satellite systems and/or, in some embodiments, terrestrial-based wired or wireless positioning systems or other data communication systems.

In an exemplary embodiment, the transmitters 110 of system 100 are configured to operate in an exclusively licensed or shared licensed/unlicensed radio spectrum; however, some embodiments may be implemented to provide signaling in unlicensed shared spectrum. The transmitters 110 may transmit signaling in these various radio bands using novel signaling as is described subsequently herein. This signaling may be in the form of a proprietary signal configured to provide specific data in a defined format advantageous for location and navigation purposes. For example, as described subsequently herein, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for quick location determination upon device power-on or location activation, reduced power consumption, and/or to provide other advantages.

Various embodiments of WAPS may be combined with other positioning systems to provide enhanced location and position determination. Alternately, or in addition, a WAPS system may be used to aid other positioning systems. In addition, information determined by receiver units 120 of WAPS systems may be provided via other communication network links 163, such as cellular, Wi-Fi, Pager, and the like, to report position and location information to a server system or systems 130, as well as to other networked systems existing on or coupled to network infrastructure 170. For example, in a cellular network, a cellular backhaul link 165 may be used to provide information from receiver units 120 to associated cellular carriers and/or others (not shown) via network infrastructure 170. This may be used to quickly and accurately locate the position of receiver 120 during an emergency, or may be used to provide location-based services or other functions from cellular carriers or other network users or systems.

It is noted that, in the context of this disclosure, a positioning system is one that localizes one or more of latitude, longitude, and altitude coordinates, which may also be described or illustrated in terms of one, two, or three dimensional coordinate systems (e.g., x, y, z coordinates, angular coordinates, etc.). In addition, it is noted that whenever the term 'GPS' is referred to, it is done so in the broader sense of Global Navigation Satellite Systems (GNSS) which may include other existing satellite positioning systems such as GLONASS as well as future positioning systems such as Galileo and Compass/Beidou. In addition, as noted previously, in some embodiments other positioning systems, such as terrestrially-based systems, may be used in addition to or in place of satellite-based positioning systems.

Embodiments of WAPS include multiple towers or transmitters, such as multiple transmitters 110 as shown in FIG. 1, which broadcast WAPS data positioning information, and/or other data or information, in transmitter output signals to the receivers 120. The positioning signals may be coordinated so as to be synchronized across all transmitters of a particular system or regional coverage area, and may use a disciplined GPS clock source for timing synchronization. WAPS data positioning transmissions may include dedicated communication channel resources (e.g., time, code and/or frequency) to facilitate transmission of data required for trilateration, notification to subscriber/group of subscribers, broadcast of messages, and/or general operation of the WAPS network. Additional disclosure regarding WAPS data positioning transmissions may be found in the incorporated applications.

In a positioning system that uses time difference of arrival or trilateration, the positioning information typically transmitted includes one or more of precision timing sequences and positioning signal data, where the positioning signal data includes the location of transmitters and various timing corrections and other related data or information. In one WAPS embodiment, the data may include additional messages or information such as notification/access control messages for a group of subscribers, general broadcast messages, and/or other data or information related to system operation, users, interfaces with other networks, and other system functions. The positioning signal data may be provided in a number of ways. For example, the positioning signal data may be modulated onto a coded timing sequence, added or overlaid over the timing sequence, and/or concatenated with the timing sequence.

Data transmission methods and apparatus described herein may be used to provide improved location information throughput for the WAPS. In particular, higher order modulation data may be transmitted as a separate portion of information from pseudo-noise (PN) ranging data. This may be used to allow improved acquisition speed in systems employing CDMA multiplexing, TDMA multiplexing, or a combination of CDMA/TDMA multiplexing. The disclosure herein is illustrated in terms of wide area positioning systems in which multiple towers broadcast synchronized positioning signals to UEs and, more particularly, using towers that are terrestrial; however, the embodiments are not so limited and other systems within the spirit and scope of the disclosure may also be implemented.

In an exemplary embodiment, a WAPS uses coded modulation sent from a tower or transmitter, such as transmitter 110, called spread spectrum modulation or pseudo-noise (PN) modulation, to achieve wide bandwidth. The corresponding receiver unit, such as receiver or user device 120, includes one or more components to process such signals using a despreading circuit, such as a matched filter or a series of correlators, for example. Such a receiver produces a waveform which, ideally, has a strong peak surrounded by lower level energy. The time of arrival of the peak represents the time of arrival of the transmitted signal at the UE. Performing this operation on a multiplicity of signals from a multiplicity of towers, whose locations are accurately known, allows determination of the receivers location via trilateration. Various additional details related to WAPS signal generation in a transmitter, such as transmitter 110, along with received signal processing in a receiver, such as receiver 120, are described subsequently herein.

In one embodiment, a WAPS may use binary coded modulation as the spreading method. The WAPS signals of an exemplary embodiment may include two specific types of information: (1) a high precision ranging signal (which may be delivered quickly relative to other signals), and (2) location data such as transmitter ID and position, time of day, health, environmental conditions such as atmospheric information (e.g., pressure, temperature, humidity, direction and force of wind, and other conditions). WAPS may, similarly to GPS, transmit location information by modulating a high speed binary pseudorandom ranging signal with a lower rate information source. In addition to this application, the incorporated applications disclose embodiments of methods that use a pseudorandom ranging signal and a modulating information signal, both of which may utilize higher order modulations, such as quaternary or octonary modulation. In one embodiment, the ranging signal is binary phase modulated, and location information is provided in a separate signal using higher order modulation.

Conventional systems use a format of a position location signal (e.g., used in a Time Division Multiplexing arrangement) in which each slot transmission comprises a pseudorandom ranging signal followed by various types of location data. These conventional systems also include a synchronization, or sync, signal, which may be deleted if the pseudorandom ranging signal is used also as the sync signal. However, as with other earlier systems, the location data of these conventional systems is binary, which limits throughput. These systems also transmit a large number of binary bits during the interval in which the location data is transmitted.

To address these limitations, in exemplary embodiments, a binary, or quaternary, pseudorandom signal may be transmitted in a particular slot followed by a very higher order modulated data signal. For example, in a given slot one or more location information symbols may be transmitted using differential 16-phase modulation, in order to transmit four bits of information per slot. This represents a four-fold throughput improvement versus the one bit typically transmitted when binary phase modulation is imposed upon the pseudorandom carrier. Other types of modulation of location information may also be utilized, such as 16 QAM, etc. In addition certain error control modulation methods may be used for the higher level modulation, such as the use of Trellis codes. These modulation methods generally reduce error rates.

Figure 2:
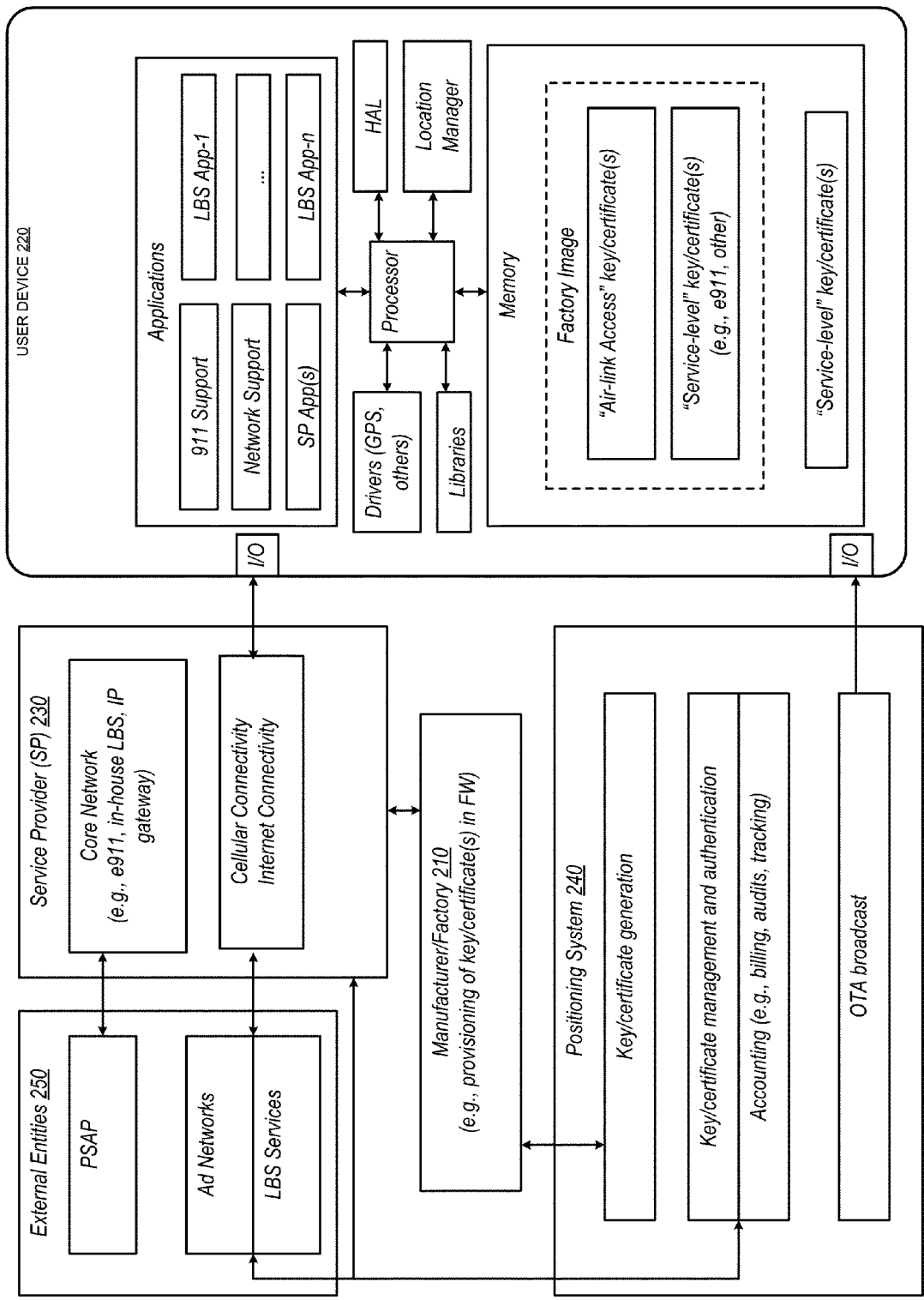
FIG. 2 illustrates a diagram illustrating certain details of one embodiment of a terrestrial location/positioning system on which embodiments may be implemented.

FIG. 2 depicts certain aspects of a positioning system 240 configured to various implement conditional access processes described herein. As shown in FIG. 2, the positioning system 240 may perform various functions. For example, the positioning system 240 may generate and make available ALACs which may be individually generated and provided to the manufacturer 210 and/or the service provider 230 in blocks of ALACs for addition to the user device 220 (e.g., the GPS FW Image). The ALACs may be implemented in a device-specific manner, including use of a device identifier, and device-specific algorithms to provide an additional layer of protection for the ALACs. The positioning system 240 may further operate a billing and audit system to track and charge for the use of positioning functionality provided by the positioning system 240.

The positioning system 240 may generate and make available ASLCs to the manufacturer 210, the user device 220, the service provider 230, and/or the external entities 250 (e.g., an application developer or provider). The ASLCs maybe serialized to include a unique device identifier like IMEI, MAC-Address etc.

The positioning system 240 may generate and administer developer keys, SDKs and APIs for external entities 250 that are looking to incorporate position information into downloadable applications. Each developer key may have several associated ASLCs based on the service levels of an associated application. Each application ASLC may contain the developer key as unique identifier, and may also contain other unique IDs. The positioning system 240 may also maintain a server to process requests from deployed applications in the field (i.e., on user device 220) for dynamic transmissions of ASLCs to the user device 220.

The manufacturer 210 may image one or more ALACs and ASLCs (e.g., obtained from the positioning system 240, or independently created and maintained) onto the receiver along with requisite firmware ("FW") and software ("SW"). The manufacturer 210 may also load the libraries as an image. Manufacturer 210s may include chipset suppliers, device OEMs, OS vendors. By comparison the same ALAC may be used for all transmissions from all transmitters, while a different ASLC may be used for each application on each receiver, and based on particular user accounts. Both the ASLC and the ALAC may be encrypted or otherwise protected from unauthorized access at the UE.

The service provider 230 may provide various services to the user device 220, including cellular services and web-based services. Additional services may include any wireless or wired delivery of content (e.g., video content, audio content, image content, text content, other content). The service provider 230 may store ASLCs associated with applications it provides to the user device 220. The service provider 230 also enables Control-Plane (c-Plane) messaging flow for E-911 and network management when applicable. The service provider 230 may further enable User-Plane (u-Plane), via SUPL messaging flows for in-house LBS.

The external entities 250 may include vendors that provide various location services to users via the user's receiver. For example, external entities 250 may include PSAPs, location-based ad networks, and LBS application developers/publishers, among others. The positioning system 240 and service provider 230 may serve an external entity 250 with a range of services, including location assistance, ASLC verification and provisioning, value-added-services, billing services and audit services.

A user device 220 may include a smartphone, tablet, and a connected computing device. The user device 220 may be configured to control access to position information by individual applications (e.g., e-911, network management (NW), or LBS). Control of the access may be accomplished using ASLCs that are imaged on firmware or downloaded after the user device 220 is manufactured and enters the stream of commerce. As shown, a driver and a library layer may assist in the managing of ASLCs for multiple applications and users on device, in the decryption of position information, and in limiting the use of the decrypted position information by an application based on permissions indicated by the ASLC. For example, the library may be capable of associating an ASLC to its relevant application (e.g., E911, Network Management, LBS, etc.), and to provide or arbitrate delivery of appropriate position information to the application.

Various system features have been described above, including transmitters and receivers. FIG. 3 and FIG. 4A, FIG. 4B and FIG. 4C, described below, provide further details regarding certain implementations of transmitter and receivers.

Figure 3:
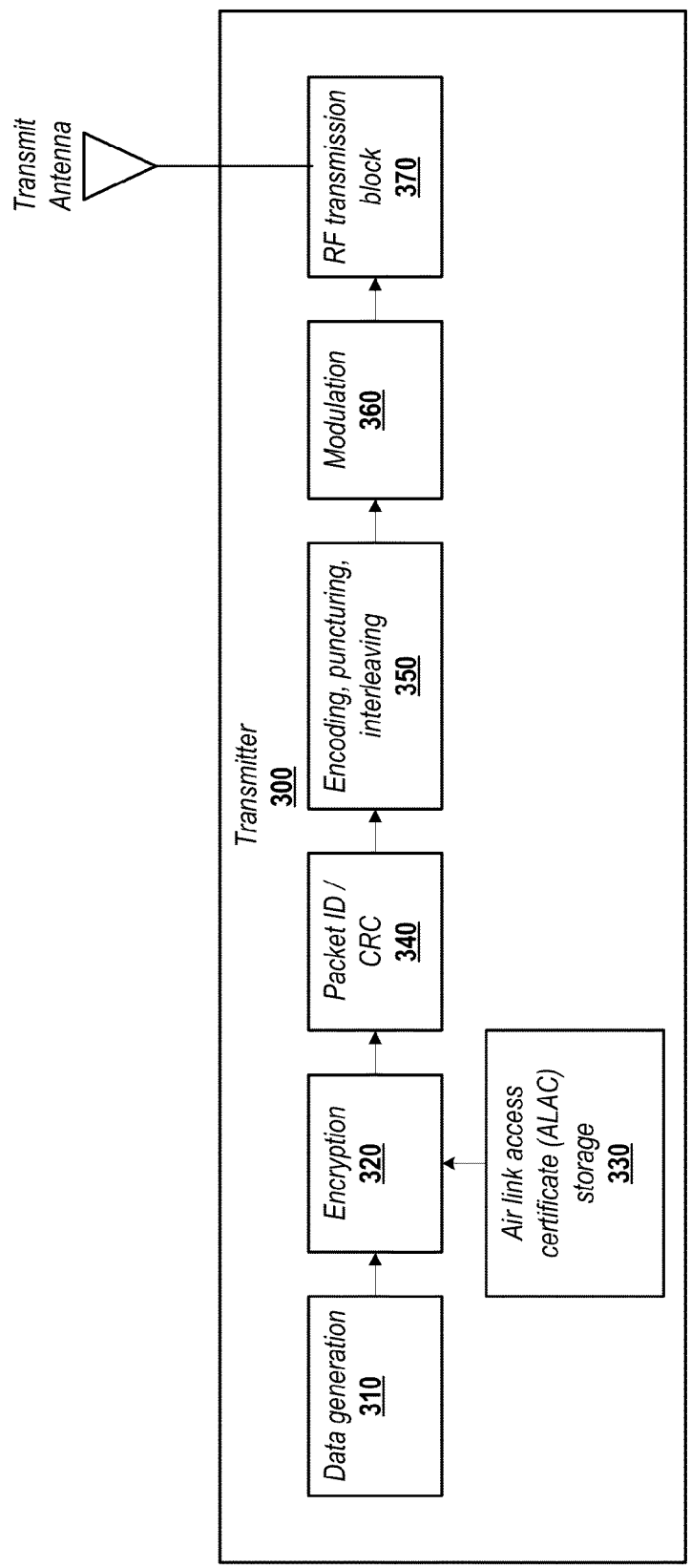
FIG. 3 depicts a diagram illustrating details of one embodiment of a location/position transmitter/beacon.

FIG. 3 presents diagram illustrating certain details of one embodiment 300 of a beacon/transmitter system from which location/positioning signals as described subsequently herein may be sent. Transmitter embodiment 300 may correspond with transmitters 110 as shown in FIG. 1. It is noted that transmitter embodiment 300 includes various components for performing associated signal reception and/or processing; however, in other embodiments these components may be combined and/or organized differently to provide similar or equivalent signal processing, signal generation, and signal transmission.

Although not shown in FIG. 3, transmitter/beacon embodiment 300 may include one or more GPS components for receiving GPS signals and providing location information and/or other data, such as timing data, dilution of precision (DOP) data, or other data or information as may be provided from a GPS or other positioning system, to a processing component (not shown). It is noted that while transmitter 300 is shown in FIG. 3 with a GPS component, other components for receiving satellite or terrestrial signals and providing similar or equivalent output signals, data, or other information may alternately be used in various embodiments. GPS or other timing signals may be used for precision timing operations within transmitters and/or for timing correction across the WAPS network.

Transmitter 300 may also include one or more transmitter components (e.g., RF transmission component 370) for generating and sending transmitter output signals as described subsequently herein. A transmitter component may also include various elements as are known or developed in the art for providing output signals to a transmit antenna, such as analog or digital logic and power circuitry, signal processing circuitry, tuning circuitry, buffer and power amplifiers, and the like. Signal processing for generating the output signals may be done in the a processing component (not shown) which, in some embodiments, may be integrated with another component described in relation to FIG. 3 or, in other embodiments, may be a standalone processing component for performing multiple signal processing and/or other operational functions.

One or more memories (not shown) may be coupled with a processing component (not shown) to provide storage and retrieval of data and/or to provide storage and retrieval of instructions for execution in the processing component. For example, the instructions may be instructions for performing the various processing methods and functions described subsequently herein, such as for determining location information or other information associated with the transmitter, such as local environmental conditions, as well as to generate transmitter output signals to be sent to the user devices 120 as shown in FIG. 1.

Transmitter 300 may further include one or more environmental sensing components (not shown) for sensing or determining conditions associated with the transmitter, such as, for example, local pressure, temperature, humidity, wind, or other (collectively or individually, "atmospheric") conditions. In an exemplary embodiment, atmospheric (e.g., pressure) information may be generated in the environmental sensing component and provided to a processing component for integration with other data in transmitter output signals as described subsequently herein. One or more server interface components (not shown) may also be included in transmitter 300 to provide an interface between the transmitter and server systems, such as server system 130 as shown in FIG. 1, and/or to a network infrastructure, such as network infrastructure 170 as shown in FIG. 1. For example, system 130 may send data or information associated with the location system and/or user devices to transmitters 300 via an interface component of the transmitter.

Each transmitter 300 may send data at the physical layer at an adjustable number of bits per second per slot (e.g., 96 bits per second per slot or greater), and each transmitter may be independent of the others, including its position information. Transmitter 300 may include various components to generate, encrypt, protect, modulate and transmit data. For example, transmitter 300 may include a data generation component 310 to generate position information, an encryption component 320 to encrypt the position information based on a particular air-link access certificate (ALAC), an access certificate storage component 330 to store the ALAC, and other components—e.g., a packet ID/CRC component 340, an encoding, puncturing and interleaving component 350, a modulation component 360, and an RF transmission component 370, among others not shown. Components 340 and 350 may provide forward error correction (FEC) and CRC schemes, along with other data formatting schemes to reduce the effects of fading, path loss, and other environmental conditions. Component 360 provides modulation on data.

Although modulation and signal structure may vary, where varying numbers of bits per frame can be used, it is contemplated that 190 bits per frame are available for transmissions from the transmitter 300. By way of example, 102 data bits are available after encoding overhead, of which 7 bits are reserved for unencrypted framing information, which leaves 95 bits for encrypted position information. It is preferred that encryption be minimally used to maintain low overhead. By way of example, one encryption rate may be about 95 bits every 3 seconds. Transmissions may repeat themselves for a few cycles (e.g., 10 cycles or 30 seconds) before data changes. Various payloads are contemplated, including: latitude, longitude, altitude, pressure, temperature, transmission correction, and transmission quality. Additional payloads may include security information, service ID, conditional access data (e.g., ASLC information). These various payloads can be segmented over multiple slots. One of skill will appreciate other payloads, other numbers of bits, and different ways to package payloads.

In some cases, there is a need for an n-bit indicator to denote the type of packet that is being transmitted, which type of information will be transmitted over several packets, or how multiple packets of the same information relate to each other. Packet structures may include this n-bit indicator at any point in the packet. FIG. 10A illustrates one example of a packet structure showing four packet type indicator bits, and other bits, and FIG. 10B illustrates one example of a series of packets that use the four-bit packet type indicator.

As shown in FIG. 10A and FIG. 10B, four bits may indicate a packet type, and the main packet payload may include 98 bits. The four bits may be unencrypted, and the packet types that are '0' may be unencrypted, while the packet types that are '1' may be encrypted. For packet types that are not '0' or '1', for example, but not by way of limitation, the fifth bit may be the encryption bit, and may denote whether this packet is encrypted or not. This bit may be unencrypted. The sixth bit may be the start bit, and may denote whether this begins a new packet (1) or the continuation of a previous packet (0). This bit may be unencrypted. The seventh bit may be the stop bit, and may denote whether this is the last packet (1) or not (0). This bit may be unencrypted. The next 95 bits may contain the main packet payload, which may be encrypted if the encryption bit is 1, and may be otherwise unencrypted if the encryption bit is 0. The payload may optionally contain the index of the current packet and/or the total number of packets to be expected with the current information being sent.

Figure 4A:
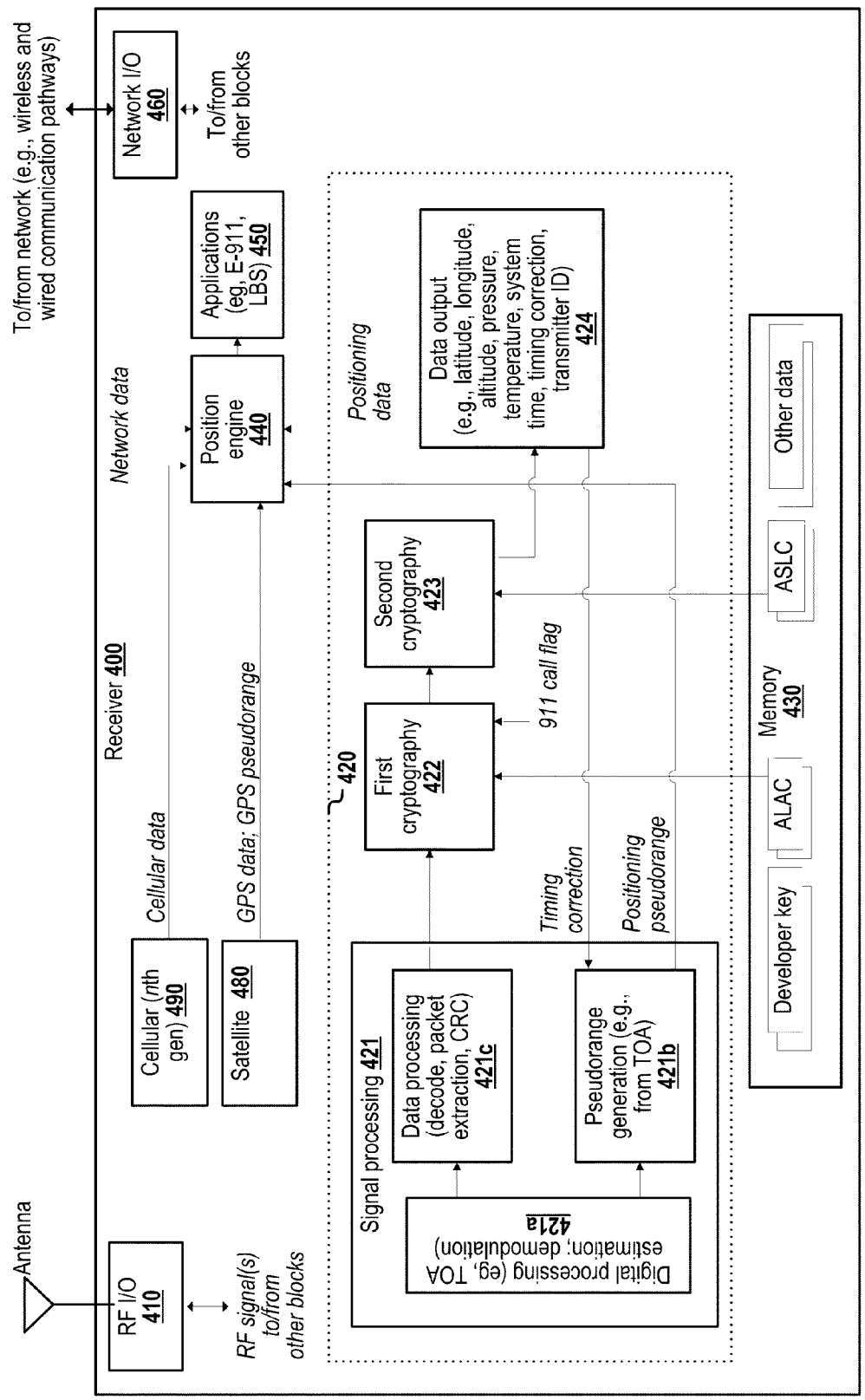
FIG. 4A depicts a diagram illustrating details of one embodiment of a receiver/user device.

Attention is now turned to FIG. 4A, which depicts features of a receiver 400 at which transmitter signals may be received and processed to determine location/position information (e.g., on behalf of an E-911 or LBS application).

Receiver embodiment 400 may correspond with user device 120 as shown in FIG. 1, and may include one or more GPS components 480 for receiving GPS signals and providing location information and/or other data, such as timing data, dilution of precision (DOP) data, or other data or information as may be provided from a GPS or other positioning system, to a processing component (not shown). Of course, other Global Navigation Satellite Systems (GNSS) are contemplated, and it is to be understood that disclosure relating to GPS may apply to these other systems. It is noted that while receiver 400 is shown in FIG. 4A with a GPS component, other components for receiving satellite or terrestrial signals and providing similar or equivalent output signals, data, or other information may alternately be used in various embodiments. Of course, any location processor may be adapted to receive and process position information described herein or in the incorporated applications.

Receiver 400 may also include one or more cellular components 490 for sending and receiving data or information via a cellular or other data communications system. Alternately, or in addition, receiver 400 may include communications components (not shown) for sending and/or receiving data via other wired or wireless communications networks, such as Wi-Fi, Wi-Max, Bluetooth, USB, or other networks.

Receiver 400 may include one or more components outlined by the dotted border 420 (referred to as "components 420") that are configured to receive signals from terrestrial transmitters, such as transmitters 110 as shown in FIG. 1, and processing the signals to determine position/location information as described subsequently herein. Components 420 may be integrated with and/or may share resources such as antennas, RF circuitry, and the like with other components shown in FIG. 4A. For example, components 420 and GPS component 480 may share some or all radio front end (RFE) components and/or processing elements. A processing component (not shown, but mentioned generally here to indicate processing functionality in the receiver 400) may integrate some or all of the components 420, or may share resources with some or all of the components 420 and/or GPS component 480 to determine position/location information and/or perform other processing functions as described herein. Similarly, cellular component 490 may share RF and/or processing functionality with RF component 410 and/or components 420. A network component 460 is also shown, which may refer to local area, wide area, or other networks that employ any type of wired and wireless communication pathways. Components 410, 420, 460, 480 and 490 may each deliver data to a position engine 440, which uses the data to determine an estimated location of the receiver 400. The position engine 400 may be implemented as known in the art or later developed in the art, including such implementations that include a processor configured to compute the estimated location.

For example, in one implementation, component 490 may deliver positioning data securely through the control plane or user plane or the data may be directly obtained through an internet link. The data on the interface between 490 and the cellular modem may also be protected through interface encryption/decryption specific to the receiver 400.

One or more memories 430 may be coupled with processing component (not shown) and other components to provide storage and retrieval of data and/or to provide storage and retrieval of instructions for execution in the processing component. For example, the instructions may perform the various processing methods and functions described herein, such as decrypting position information and determining location information. Accordingly, certain components (e.g., components 421-424) included among components 420 may perform processing of position information, decryption keys, and/or other information described herein. Some or all of that processing may alternatively be performed at a stand-alone processor (not shown).

Position data comprising the position estimate or information used for remote position computation may be transmitted to these remote components using industry standard protocols such as Control-Plane signaling, or User Plane (SUPL) signaling or internet/data protocols or some combination thereof.

Receiver 400 may further include one or more environmental sensing components (not shown) for sensing or determining conditions associated with the receiver, such as, for example, local pressure, temperature, humidity or other conditions, that may be used to determine the location of the receiver 400. In an exemplary embodiment, pressure information may be generated in such an environmental sensing component for use in determining location/position information in conjunction with received transmitter, GPS, cellular, or other signals.

Receiver 400 may further include various additional user interface components, such as a user input component (not shown), which may be in the form of a keypad, touchscreen display, mouse, or other user interface element. Audio and/or video data or information may be provided on an output component (not shown), such as in the form or one or more speakers or other audio transducers, one or more visual displays, such as touchscreens, and/or other user I/O elements as are known or developed in the art. In an exemplary embodiment, such an output component may be used to visually display determined location/position information based on received transmitter signals, and the determined location/position information may also be sent to cellular component 490 to an associated carrier or other entity.

The receiver 400 may include various other components configured to carry out various features of the disclosure, including processes illustrated in FIG. 5A, FIG. 6, FIG. 7 and FIG. 8. For example, the components 420 may include a signal processing component 421 that comprises a digital processing component 421*a* configured to demodulate the received RF signal from the RF component 410, and also to estimate time of arrival (TOA) for later use in determining location. The signal processing component 421 may further include a pseudorange generation component 421*b* and a data processing component 421*c*. The pseudorange generation component 421*b* may be configured to generate "raw" positioning pseudorange data from the estimated TOA, refine the pseudorange data, and to provide that pseudorange data to the position engine 440, which uses the pseudorange data to determine the location of the receiver 400. The data processing component 421*c* may be configured to decode the encoded position information, extract encrypted packet data from the encoded position information and perform error correction (e.g., CRC) on the data. The data processing component 421*c* outputs encrypted packet data to a first cryptography component 422.

The first cryptography component 422 may be configured to at least decrypt the position information from the encrypted packet data based on an ALAC stored in the memory 430. Since multiple ALACs may be stored on the receiver 400 and only one of them is applicable at a given time, the first cryptography block 422 can employ various techniques to determine the correct ALAC key to use. The data packet itself can have a CRC/digest field that passes check only when the correct ALAC key is applied. In the absence of a CRC/digest field due to packet content constraints, the individual fields of the decrypted packet can be checked for the expected value ranges of that field. In addition, since the receiver can obtain packet data from multiple transmitters near the receivers, the position information from the multiple transmitters will pass certain coherency checks such as the distances between the transmitters, geographic identifiers, and others, only when the correct ALAC key is selected. The first cryptography component 422 may also, upon receiving an indication that an emergency 911 call has been initiated, output the decrypted position information to an appropriate processing component associated with an E-911 procedure.

The components 420 in FIG. 4A may further comprise a second cryptography component 423 that is configured to decrypt some or all of the position information based on an appropriate ASLC stored in the memory 430. The ASLC may be determined by which application has requested the position information or a location fix. For example, ASLC's may be associated with LBS applications or E-911 applications on the receiver 400.

Once the position information is decrypted by the second cryptography component 423, the decrypted position information is output to a data unit output component 424 that determines discrete data units of the position information (e.g., latitude, longitude, altitude, pressure, temperature, humidity, system time, timing correction, and/or transmitter ID). Specific data units of the position information may then be transmitted to the position engine 440 based on service levels indicated by the ASLC for the application that requested access to the position information.

The position engine 440 may be configured to process the position information (and, in some cases, GPS data, cell data, and/or other network data) in order to determine the location of the receiver 400 within certain bounds (e.g., accuracy levels, etc.). Once determined, location information may be provided to the applications 450. One of skill in the art will appreciate that the position engine 440 may signify any processor capable of determining location information, including a GPS position engine or other position engine. Locations of the various components shown in FIG. 4A are contemplated at different chip space within the receiver.

As disclosed elsewhere herein, and repeated here for clarity, each application on the receiver 400 may need its own ASLC to access position information in order to determine the location of the receiver 400. With respect to some aspects, one ASLC may be used by multiple applications, and multiple ASLCs may be used by one application but for different users or under different circumstances. The ASLCs may be used to limit use of particular position information during particular time periods and in particular service areas.

E-911, Network Support and LBS applications/services may be handled separately from each other, where their respective ASLCs may be loaded into firmware of the receiver 400 or uploaded to memory after manufacture of the receiver 400. Each ASLC may be used to provide each application/service its own feed of the position information. Separate processing pathways may be used to further separate these applications/services.

The receiver 400 may have limited hardware/software capabilities dedicated for location determinations. The total footprint available for the conditional access features described herein may be on the order of 32 kilobytes, although other footprints are contemplated.

Position information may be processed at a GPS processor, an application processor or at an external server. In accordance with one aspect, features described herein may be carried out on or in association with a GPS integrated circuit (IC) on the receiver. For example, a host processor at the receiver may be used to communicate with a GPS IC via a bi-directional serial link. Latitude and longitude, along with other information may be transmitted using this serial link. The serial link may be used for certificate exchanges (e.g., ASLCs) to the GPS IC. It is contemplated that the GPS IC comprises a signal processing section that searches for transmitters (e.g., through correlation with PN sequences) and demodulates signals received from transmitters to retrieve physical layer payload, which may be (and is, according to certain embodiments described herein) in encrypted form. A decryption engine can the decrypt the data before providing the data to the next processing layer, which may be the position engine. The position engine may use the decrypted data to compute receiver location. The various engines may be provisioned in the GPS IC, or in other receiver circuitry.

Figure 4B:
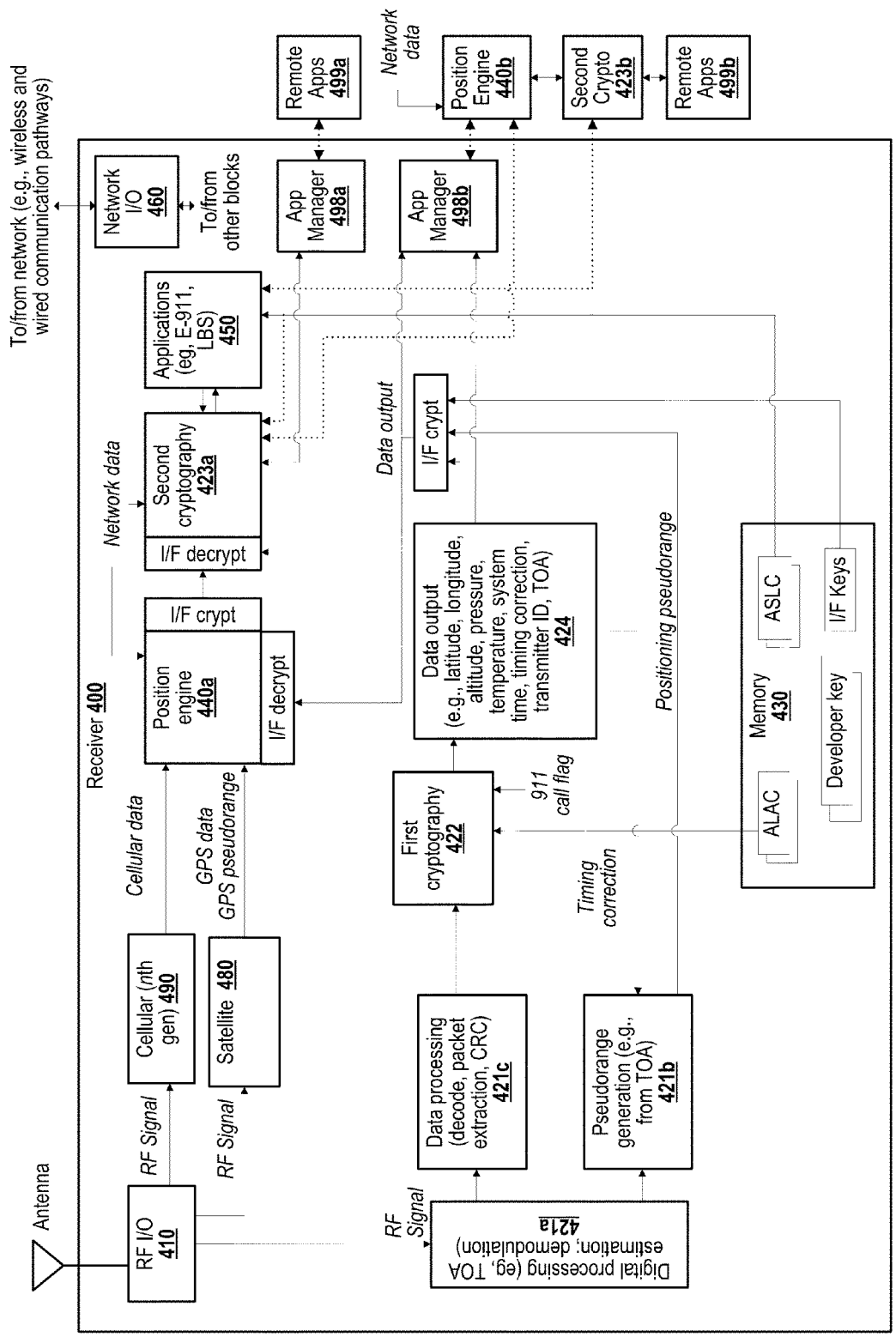
FIG. 4B depicts a diagram illustrating details of one embodiment of a receiver/user device and other components external to the receiver/user device.

Attention is now drawn to FIG. 4B, which depicts a receiver 400 at a first location, and further depicts components that reside at other locations that are remote from the location of the receiver 400. The receiver 400 and the other components may collectively or individually determine location information based on processing of transmitter signals. Certain aspects of FIG. 4A are depicted in FIG. 4B. Accordingly, description of those aspects in relation to FIG. 4A may be extended to those aspects in FIG. 4B for certain, but not necessarily all, embodiments.

As shown in FIG. 4B, the receiver 400 may include interface (I/F) encryption/decryption (also referred to as "scrambling/descrambling") components that protect data when the data crosses an unprotected interface boundary or is communicated through an unprotected communication channel. In some cases, these OF components may operate on I/F keys that are generated by each receiver 400 independently.

FIG. 4B provides for position computation at the receiver 400 before the second cryptography component 423a, which may provide the results of the position computation to an application 450 that is resident on the receiver 400, or an application 499a that does not reside on the receiver 400. Alternatively, the position computation may be performed by remote components (e.g., a remote position engine 440b of a server) that use position data received from the receiver 400, whereby the results of that remote position computation may be returned to the receiver 400, or used by remote applications 499b.

Data transfer between components depicted by dotted lines in FIG. 4B may be carried out directly between those components, or through intermediate components (e.g., the RF component 410 or the network component 460). The dotted lines may represent alternative embodiments. For example, application manager 498a may receive position data from the second cryptography component 423a, after which the application manager 498a may cause that position data to be transferred to a remote application service 499a (e.g., through network component 460, or RF component 410, or other components in the receiver 400). The remote application service 499a may then use the position data (e.g., a position estimate) to provide e911 or LBS services in relation to the receiver 400.

By way of another example, application manager 498a may receive data directly from the data unit output component 424, or through an intermediate component (e.g., an I/F encryption component), after which the application manager 498b may cause that position data to be transferred to a remote position engine 440b that computes an estimated position of the receiver 400 (e.g., the latitude, longitude, altitude of the receiver 400). The remote position engine 440b may transmit that position estimate to either the second cryptography component 423a (e.g., through network component 460, or RF component 410, or other components in the receiver 400) or the second cryptography component 423b for further processing at those components. The second cryptography component 423b, for example, may operate to control access to the position estimate by one or more remote application services 499b or an application 450 running on the receiver 400 (e.g., through transfer of the position estimate via network component 460 or RF component 410 or other components in the receiver 400). The remote application service 499b or the application 450 may then use the position estimate to provide e911 or LBS services in relation to the receiver 400. Any of the remote components may be co-located or reside at different geographic locations.

In FIG. 4B, the first cryptography component 422 outputs decrypted position information to a data unit output component 424 that determines discrete data units of the position information (e.g., latitude, longitude, altitude, pressure, temperature, other atmospheric information or measurements, system time, timing correction, and/or transmitter ID). These data units are then transmitted to the position engine 440a or 440b. The position engine 440a or 440b may be configured to process the position information (and, in some cases, GPS data, cell data, and/or other network data) in order to determine the location of the receiver 400 within certain bounds (e.g., accuracy levels, and other bounds). Once determined, location information may be provided to an application 450, 499a, or 499b through the second level cryptography 423a or 423b (and possibly through other intermediary components). One of skill in the art will appreciate that the position engine 440a or 440b may signify any processor capable of determining location information, including a GPS position engine or other position engine.

The second cryptography component 423a may be configured to encrypt certain data using session keys meant for a specific application or a group of applications with a particular service level. Service levels may authorize access to a certain subset of data units (e.g., latitude, longitude, altitude, accuracy, and others) for certain applications.

After encrypting data (e.g., using a session key), the second cryptography component 423a may then make that encrypted data available to an application 450. Session keys may be dynamically generated at the receiver 400, and may be changed periodically for improved security. When a single session key is used for a group of applications, the session key can be changed when the ASLC validity period has expired for any of the applications, thus forcing that group of applications to request a new session key.

In one embodiment, the second cryptography component 423 validates an ASLC for a particular application before exchanging the session key with the application to enable the application to decrypt the data meant for that application. The second cryptography component 423 may initially receive the ASLC from the application, or may be instructed to look up the ASLC from the memory 430 or elsewhere. Specific encrypted data units of the position information may then be accessible to that application.

The ASLC may indicate service-level authorizations for the application. In order to manage access to only the data authorized for a particular application, the second cryptography component 423a may exchange session keys with the application for sending encrypted data according to the authorization indicated in the ASLC for that application.

For a remote application 499a, the remote application manager 498a may provide a communication interface to transport the ASLC and session keys between the remote application and the second cryptography component 423a.

Figure 4C:
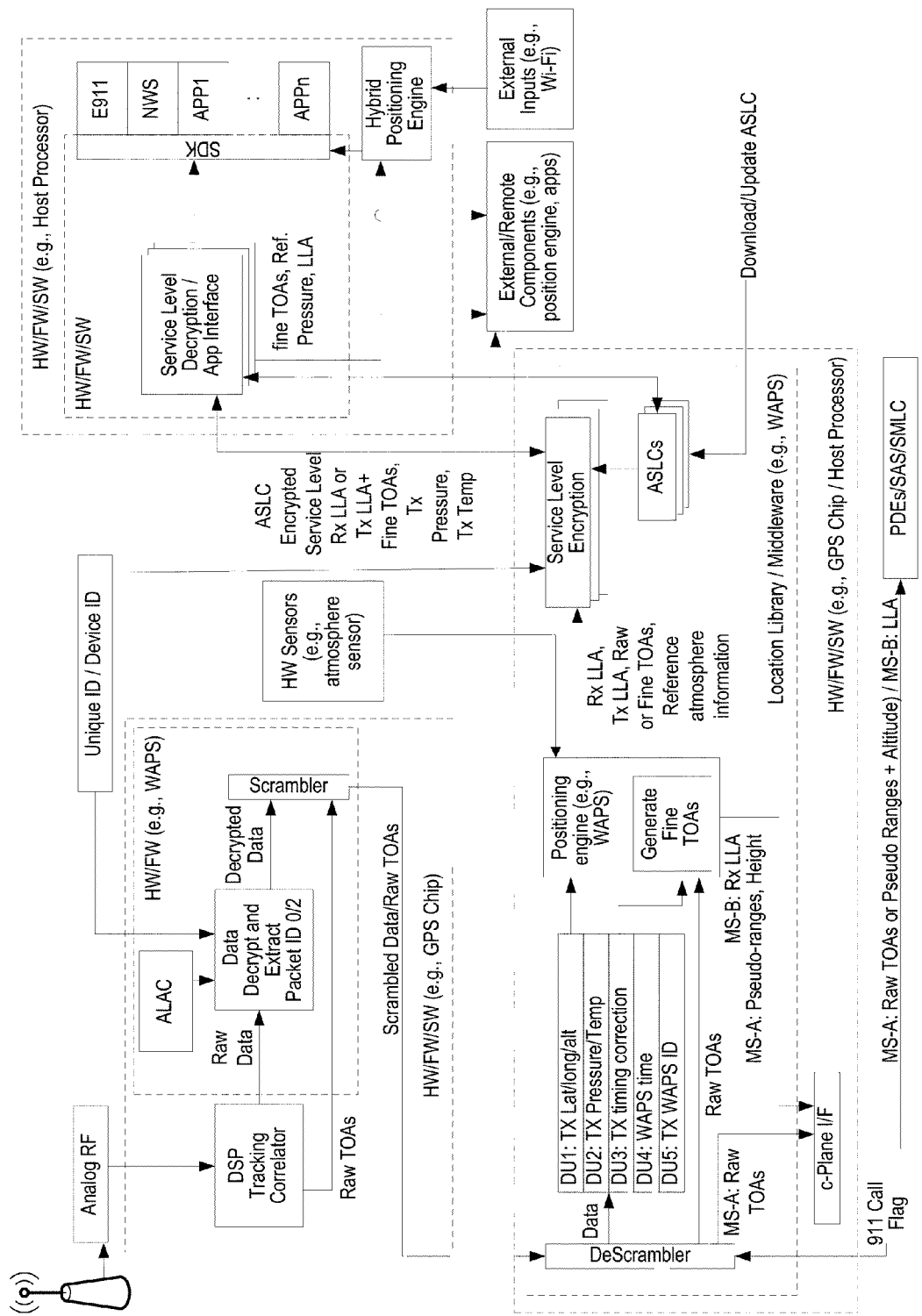
FIG. 4C depicts a diagram illustrating details of another embodiment of a receiver/user device and other components external to the receiver/user device.

Attention is turned to FIG. 4C, which depicts several aspects of the disclosure as they relate to a receiver and other components that send data to the receiver or receive data from the receiver. As shown in FIG. 4C, position signals are acquired from transmitters (e.g., using signal processing that searches for the transmitters through correlation with PN sequences). The signal processing may also demodulate the signal to retrieve the physical layer payload and raw time of arrival (TOA) for each transmitter. These signals may be acquired and tracked by various hardware (HW), firmware (FW), and/or software (SW) components. By way of example, FW and/or HW on a GPS chip may operate to decode a packet from any one of various sub-frames of the signal transmission and verify the CRC. Alternatively, a host processor could decode and verify the CRC.

Tracking HW/FW/SW may operate to generate raw TOA data and transmit raw encrypted data (e.g., packets) to a decryption component. In some implementations, a packet ID is not encrypted for all packet types. The raw encrypted data may be decrypted using ALAC keys within specific HW/FW (e.g., HW/FW specific to WAPS). The ALACs may be encrypted or otherwise wrapped based on a device ID specific to each device or class of devices. The device specific IDs may be utilized for entitlement of the WAPS location service on the device.

The ALAC decryption process, and/or FW/HW/SW responsible for decryption may vary across vendors at chip-level, receiver/handset-level, or carrier-level. The raw decrypted data along with the raw TOA measurements may then be scrambled (e.g., using a scrambling algorithm and a device generated key), and the scrambled data may be sent over a protected or unprotected data stream to a location library running on the GPS chip itself or on a host processor, or both. Scrambling may not be necessary where the decryption and the location library operate on the same HW/FW (e.g., the GPS chip).

The location library may then descramble the raw data and TOA measurements for further use within the library. For example, the descrambled data may be assembled into data units (DU) 1 through 5 as follows: DU1 (latitude, longitude, altitude (LLA) of transmitter); DU2 (pressure/temperature at transmitter); DU3 (timing correction for transmitter); DU4 (time for network of transmitters (WAPS time)); and DU5 (identifier for transmitter).

Fine TOAs may be generated using the raw and timing corrections from DU3. A positioning engine may use various data units (e.g., DU1, DU2, DU5), along with the fine TOAs and a pressure sensor reading to compute the LLA of the receiver. It is noted that DU4 may be used by a positioning engine configured to generate timing signals (e.g., used where the receiver operates to synchronize other receivers).

The receiver's LLA or any of DU1 through DU5 may be encrypted based on parameters specified by the ASLC for a requesting application or a group of applications to which the requesting application belongs. Encryption may be carried out using various techniques, including a random or pre-defined session key, another key defined by the ASLC, or other encryption methods as known in the art. Various implementations are contemplated, including implementations where the service-level encryption and decryption may involve a single instance of an application or multiple instances of different applications.

In one implementation, the encrypted data may only include data available to the requesting application as specified by the service level of that application. For example, an estimate of the receiver's LLA within a certain accuracy level may be made available (e.g., LLA accurate within 100 meters, LLA accurate within 10 meters). In such an implementation, a processor resident at the receiver may analyze known LLA with accuracy at x meters, and then generate a different LLA with accuracy at y meters depending on the service level authorization. Such an implementation may be beneficial where different paid-for service levels are associated with varying levels of position accuracy.

Either positioning engine may generate a best estimate of reference pressure using pressure and temperature readings received in DU2 for each of multiple transmitters. The reference pressure may be sent in encrypted form to either positioning engine, which may use the reference pressure and the receiver's pressure sensor reading to compute altitude as described in the incorporated references.

In certain SW architectures the positioning engine may incorporate additional measurements from other sources in a hybrid implementation that uses signals from any of Wi-Fi, GPS, WAPS, and other transmitters. Such a hybrid positioning engine may operate in conjunction with a host processor after service-level decryption of the encrypted receiver LLA or other encrypted data (e.g., any of DU1 through DU5). Alternatively, the hybrid positioning engine may operate prior to the service-level encryption so access to resultant data from the hybrid positioning engine is limited to authorized applications.

The above discussion relating to FIG. 4C may apply to MS-assist (MS-A), MS-based (MS-B), or standalone user plane call flows. In the case of a control plane call flow (e.g., E-911), the data in the form of raw or fine TOAs/pseudoranges and an altitude estimate (for MS-A mode), or data in the form of the receiver's LLA (for MS-based mode), is sent to the Positional Determining Entity (PDE), Serving Mobile Location Center (SMLC), or other device for position computation and forwarding to the PSAP. Such transmission may occur over one or more control plane channels of a cellular system.

It is noted that, although not preferred, position assistance data can be supplied to the positioning engine using alternative communication means like web-based pathways, local area network pathways, wide area network pathways, and other network pathways beyond RF pathways. Such transmission may be necessary when low signal conditions are present between the receiver and the transmitter network. When transmitted using the alternative communication means, the assistance data may be encrypted using keys associated with the ALAC, or using alternative keys specific to the communication means. Alternatively, no ALAC or similar keys may be used, but the service-level encryption and decryption may be used.

Although FIG. 4C depicts different components within different HW/FW/SW, certain embodiments may incorporate the various components of FIG. 4C into one or more hardware components like the host processor, GPS chip, or both.

Aspects Relating to Methodologies

Figure 5A:
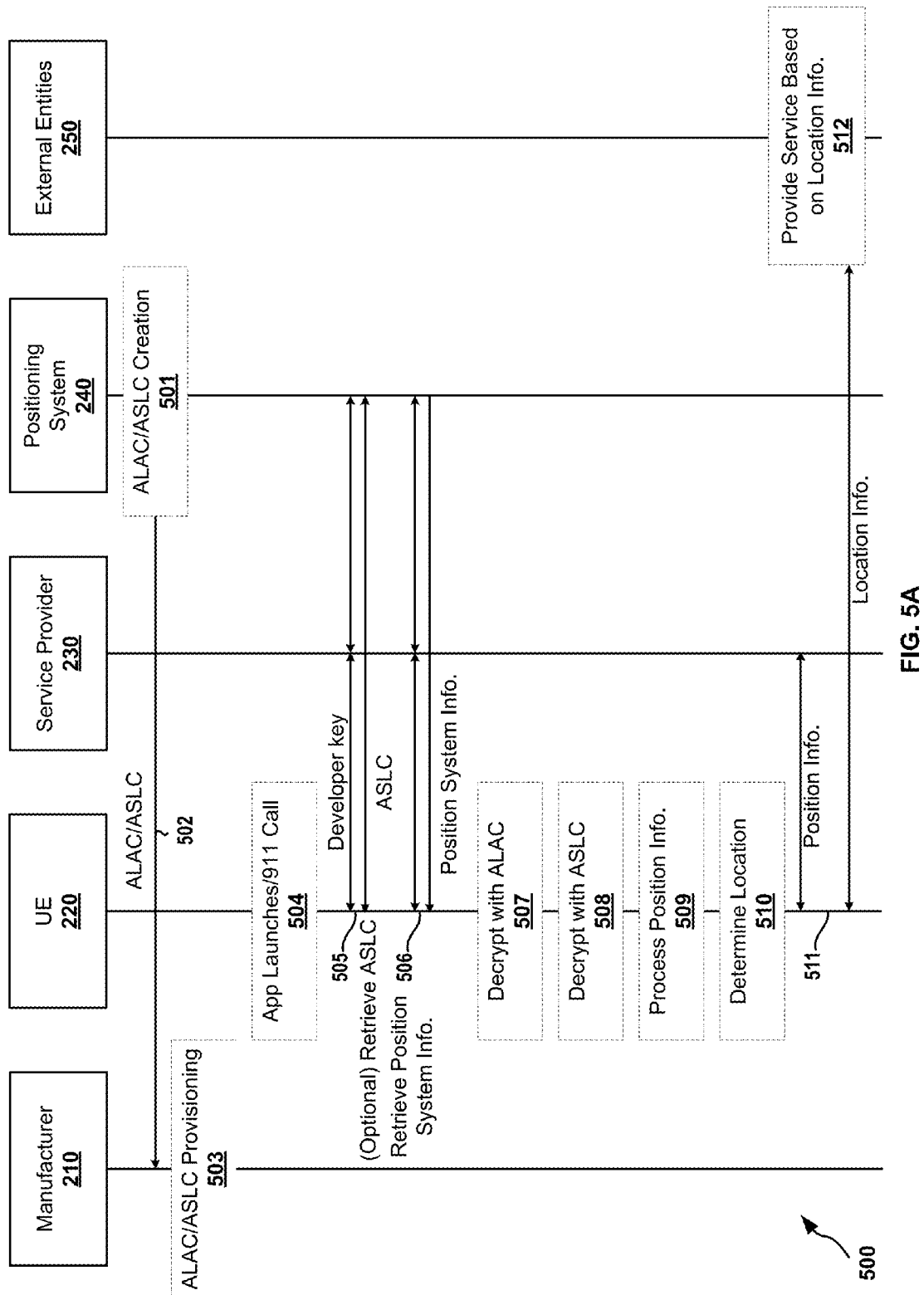
FIG. 5A illustrates a process for determining position information relating to a receiver/user device and controlling access to that position information at the receiver/user device.

FIG. 5A illustrates a diagram detailing a network process for determining position information relating to a receiver and controlling access to that position information at the receiver in accordance with certain aspects. Reference may be made to FIG. 2 while describing the process illustrated in FIG. 5A. One of skill in the art will appreciate that the process flow shown in FIG. 5A is illustrative, and that there is no intention to limit this disclosure to the order of stages shown in FIG. 5A. Accordingly, stages may be removed and rearranged, and additional stages that are not illustrated may be carried out within the scope and spirit of the disclosure.

At stage 501, the positioning system 240 may create and maintain information used to control access by receivers to position information. By way of example, the positioning system 240 may create air-link access certificates (ALACs) (also referred to as "system-level keys/certificates") and authorized service-level certificates (ASLCs) that are later used by the UE 220 to decrypt position information received from the network (e.g., from the service provider 230 and/or the positioning system 240) before using that position information based on restrictions specified by the ASLC for a particular application on the receiver that has requested the position information. At stage 502, the created ALACs and ASLCs are provided to the manufacturer 210, and the manufacturer 210 provisions the UE 220 with the ALACs/ASLCs (e.g., by imaging them in firmware) at stage 503.

At stage 504 (e.g., after a user purchases the UE 220), the UE 220 launches an application or initiates an emergency 911 call. Prior to step 504, although not explicitly shown, the application may be downloaded to the UE 220. Stage 505 is unnecessary in cases where an ASLC associated with the application has been provisioned by the manufacturer. Otherwise, the UE 220 sends a developer key associated with the application to the network. The routing of the developer key may pass through the service provider 230, the positioning system 240 and/or the developer of the application as an external entity 250 (routing not shown). After receiving and verifying the developer key, the network may then transmit an ASLC for that application to the UE 220, which may then store the ASLC.

At stage 506, the UE 220 retrieves position information from the network. The position information may be obtained from a broadcast signal originating at the positioning system 240, and/or may be obtained through the service provider 230. Similarly, the UE 220 may request the position information, or may monitor broadcasts for the position information.

At stages 507-508, the UE 220 may decrypt the position information using an ALAC (e.g., an ALAC associated with the transmitter that broadcasted the position information) and an ASLC that is associated with the application on the receiver that is requesting the position information.

At stages 509-510, the decrypted position information is processed and location information relating to the location of the UE 220 is determined (e.g., at a position engine on the UE 220).

In the case of a 911 call, at stages 511-512, the position information, the location information, and/or information used to determine position (e.g., such as pseudoranges and information about transmitters for which the pseudoranges were computed) are transmitted to the service provider 230 and/or the PSAP operating as an external entity 250. Otherwise, at stage 512, for LBS-based applications, the location information may remain at the UE 220 to carry out location based services and/or may be transmitted to an LBS entity operating as an external entity for aiding the provision of location based services from that LBS entity. Another alternative for an E-911 call is for the receiver to send an encrypted packet to a server along with raw TOA information. The encrypted packet may be decrypted to extract the information required to compute a position solution at the server.

Figure 5B:
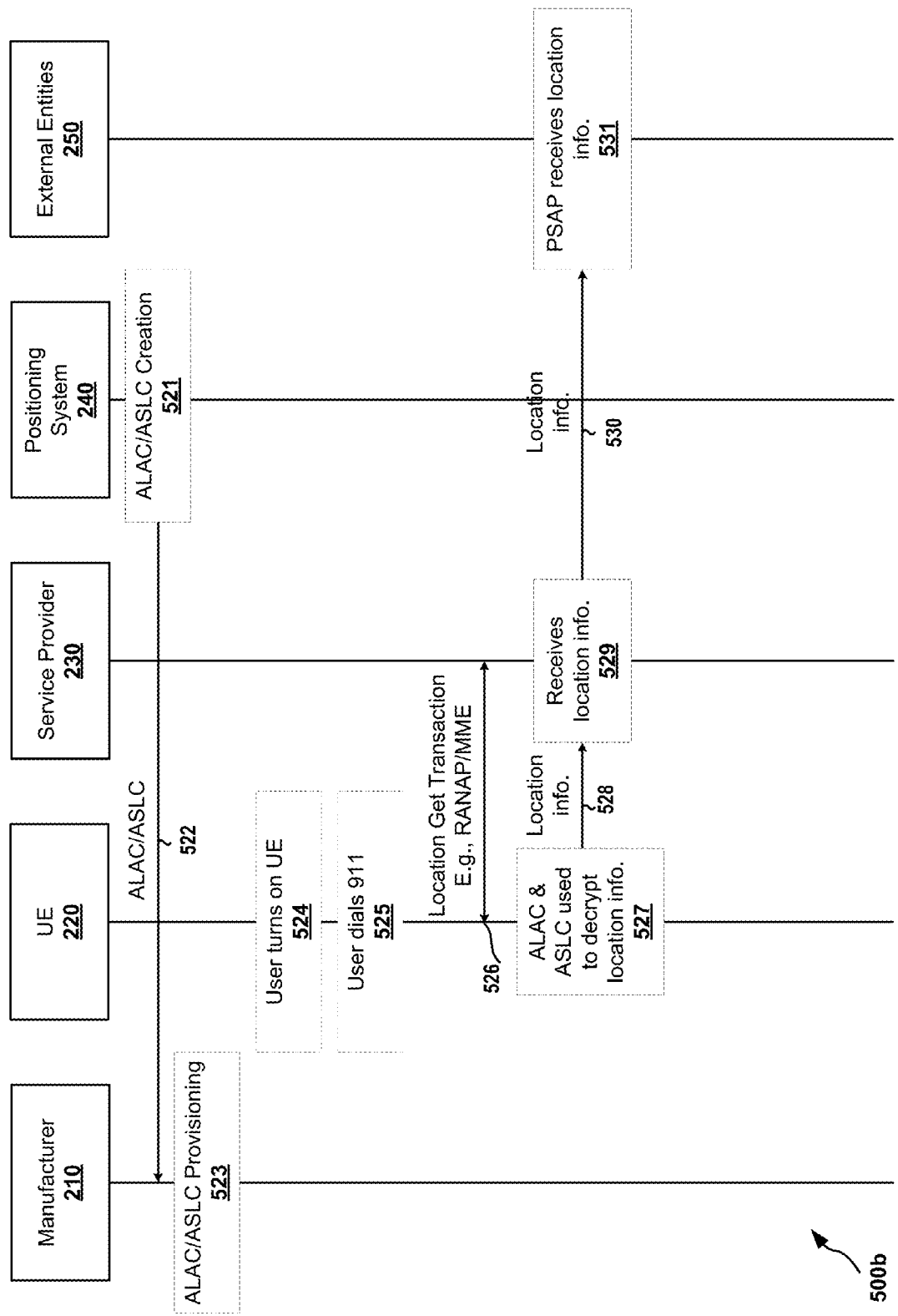
FIG. 5B illustrates a process for distributing position information in relation to an E-911 transaction.
Figure 5C:
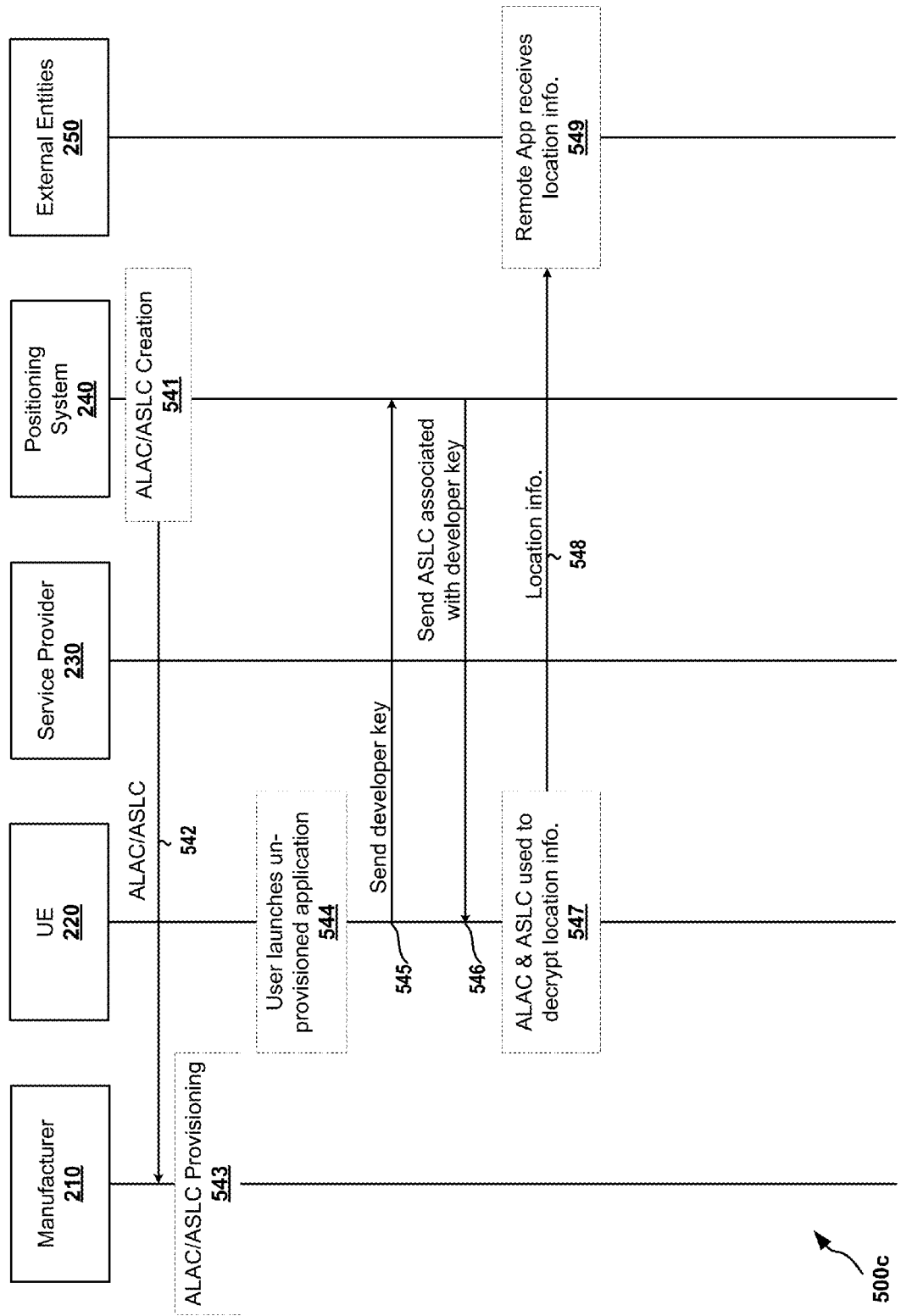
FIG. 5C illustrates a process for distributing position information in relation to an un-provisioned transaction.
Figure 5D:
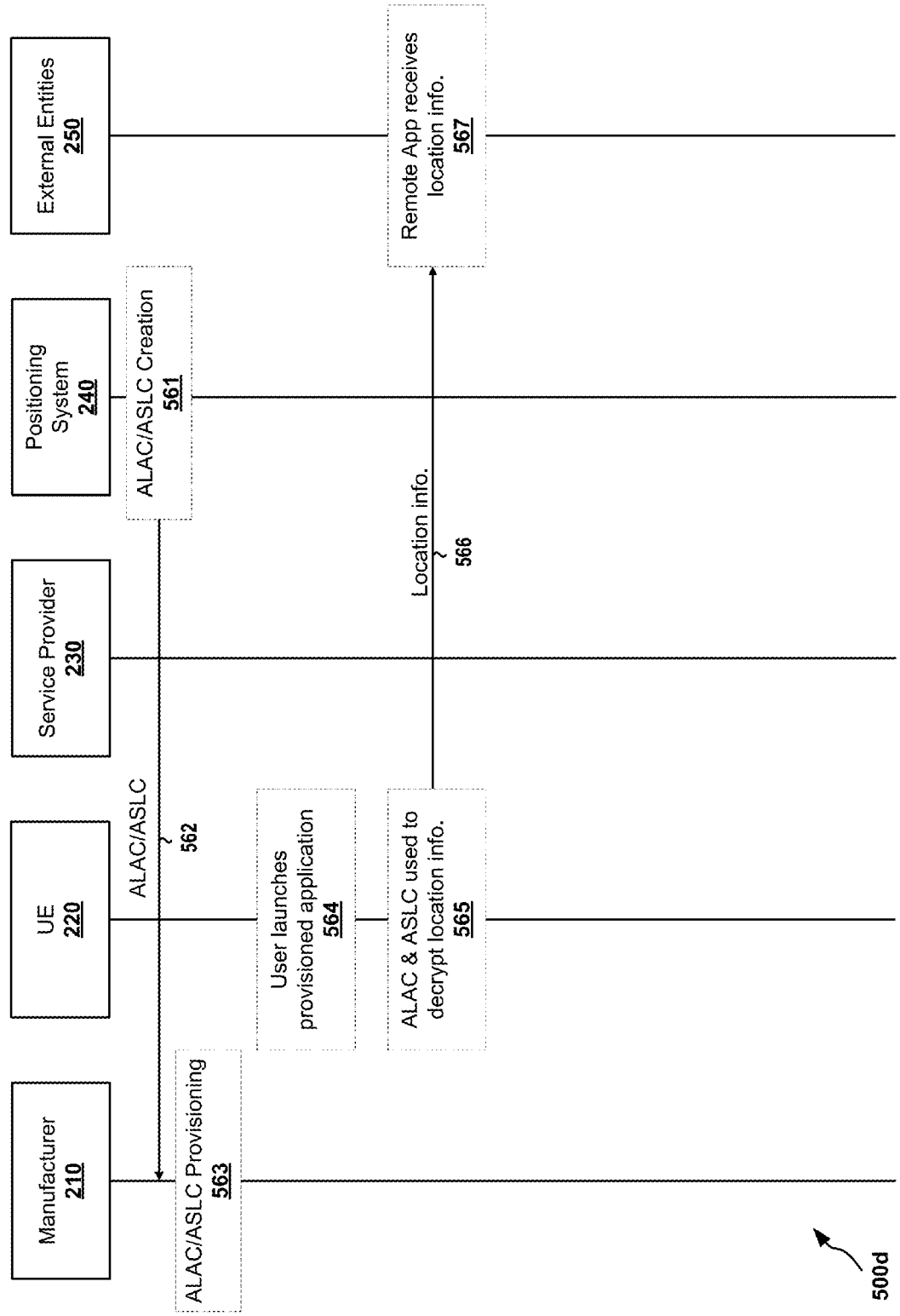
FIG. 5D illustrates a process for distributing position information in relation to a pre-provisioned transaction.

FIG. 5B illustrates a process for distributing position information in relation to a network application or E-911 transaction. Note that the ASLC may or may not be used in an E911 transaction. For example, if the ASLC is used in an E-911 call, a special ASLC may be setup for use in an emergency call which has the highest service level and no expiry date.

Figure 6:
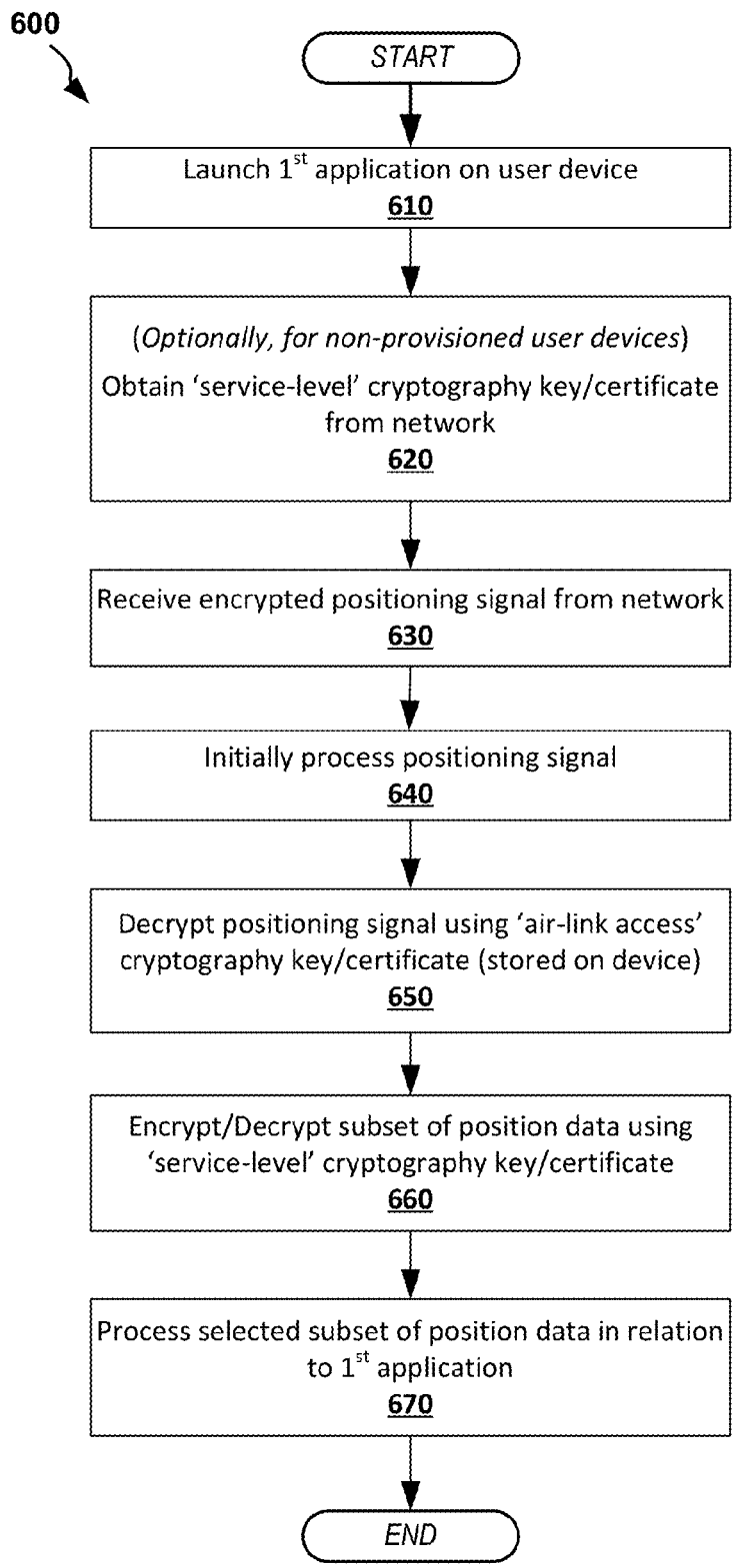
FIG. 6 illustrates a process for providing conditional access to position information at a receiver/user device.

FIG. 6 illustrates a diagram detailing a process for providing conditional access to position information at a receiver in accordance with certain aspects. Reference may be made to FIG. 2 and FIG. 4A though FIG. 4C while describing the process illustrated in FIG. 6.

As previously described, encrypted positioning signal data may be transmitted to a receiver (e.g., receiver 400 of FIG. 4A though FIG. 4C). Encrypting the positioning signal data helps safeguard its delivery to and use at authorized receivers. However, robust encryption techniques may not be viable given bandwidth constraints and limitations on processing power at the receiver. Accordingly, encryption must protect the transmitted data while minimally using data/packet space, and without requiring significant decryption at the receiver, which typically does not have the processing capability to perform robust decryption over a short period of time.

Additional encryption may be applied to safeguard use of position information by authorized applications and users based on various parameters (e.g., validity of payment associated with application, current location of user, whether a fixed amount of position requests by the user or application has been exceeded, time period during which position information may be accessed, and others). This second layer of encryption and decryption that controls distribution of position information to certain applications while restricting access to that position information by other applications is a key feature of various embodiments described herein, because it allows a network operator, carrier, application vendor/developer, or other entity shown in FIG. 2 to monetize the distribution of the position information. Furthermore, the second layer of encryption and decryption frustrates various potential attempts by unauthorized users (e.g., hackers) to gain access to the position information for use with unauthorized applications.

FIG. 6 illustrates the two stages of decryption in association with one aspect. One of skill in the art will appreciate variations in FIG. 6 that stay within the scope and spirit of the disclosure. At stage 610, the receiver launches a first application (e.g., automatically in response to some predefined condition, in response to user input). The receiver then determines if a copy of an ASLC that is associated with the first application is stored in the receiver's memory (e.g., memory 430 of FIG. 4A though FIG. 4C). If the copy exists, the receiver is "provisioned" with the ASLC, and stage 630 is executed. Otherwise, the receiver is "un-provisioned", and stage 620 is executed.

Figure 7:
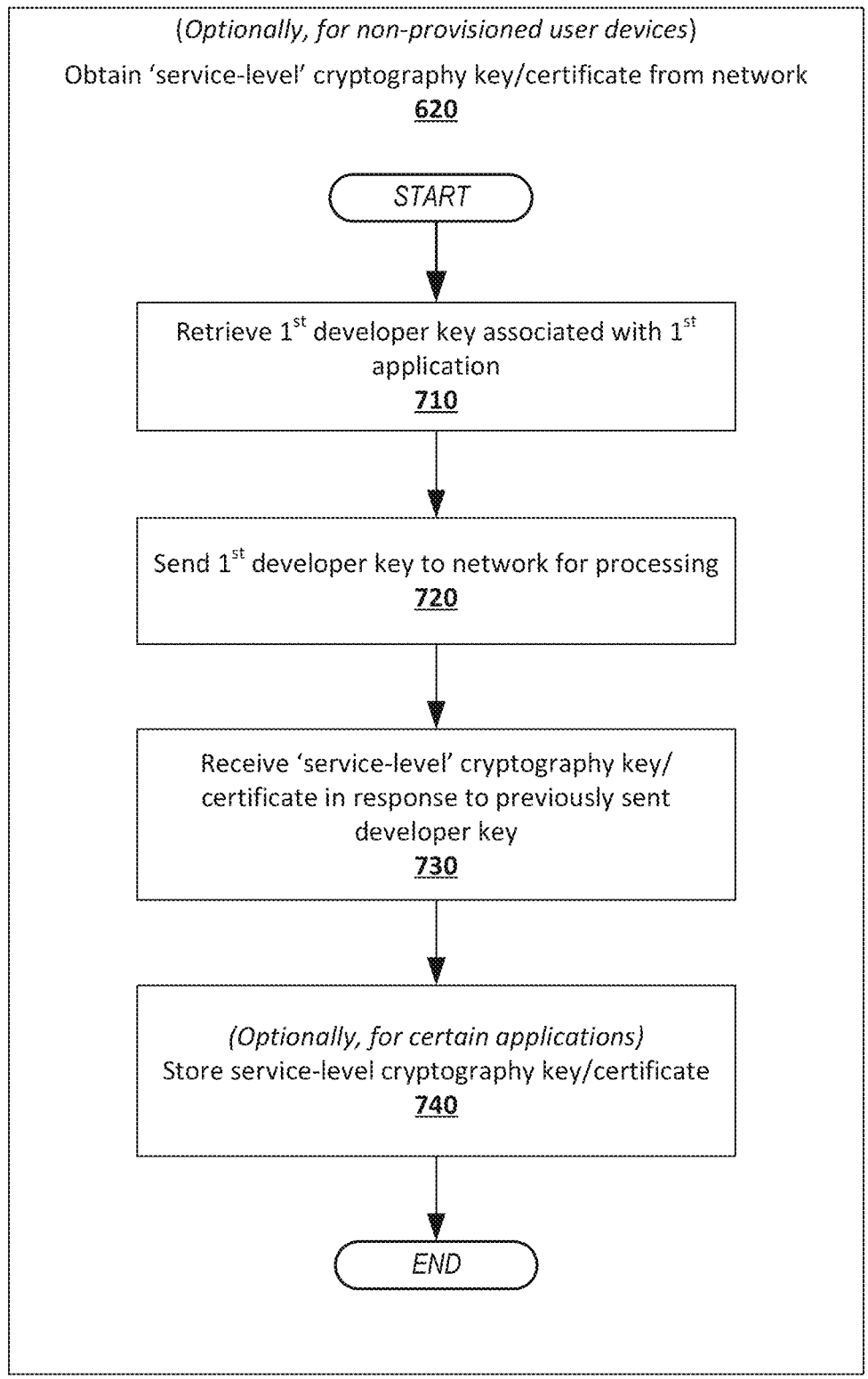
FIG. 7 illustrates a process for provisioning conditional access certificates at a receiver/user device.

At stage 620, the receiver obtains a copy of the ASLC from the network. FIG. 7 details sub-stages of stage 620. One of skill in the art will appreciate that stage 620 may be performed after other stages shown in FIG. 6 (e.g., after any stage before stage 660).

Figure 8:
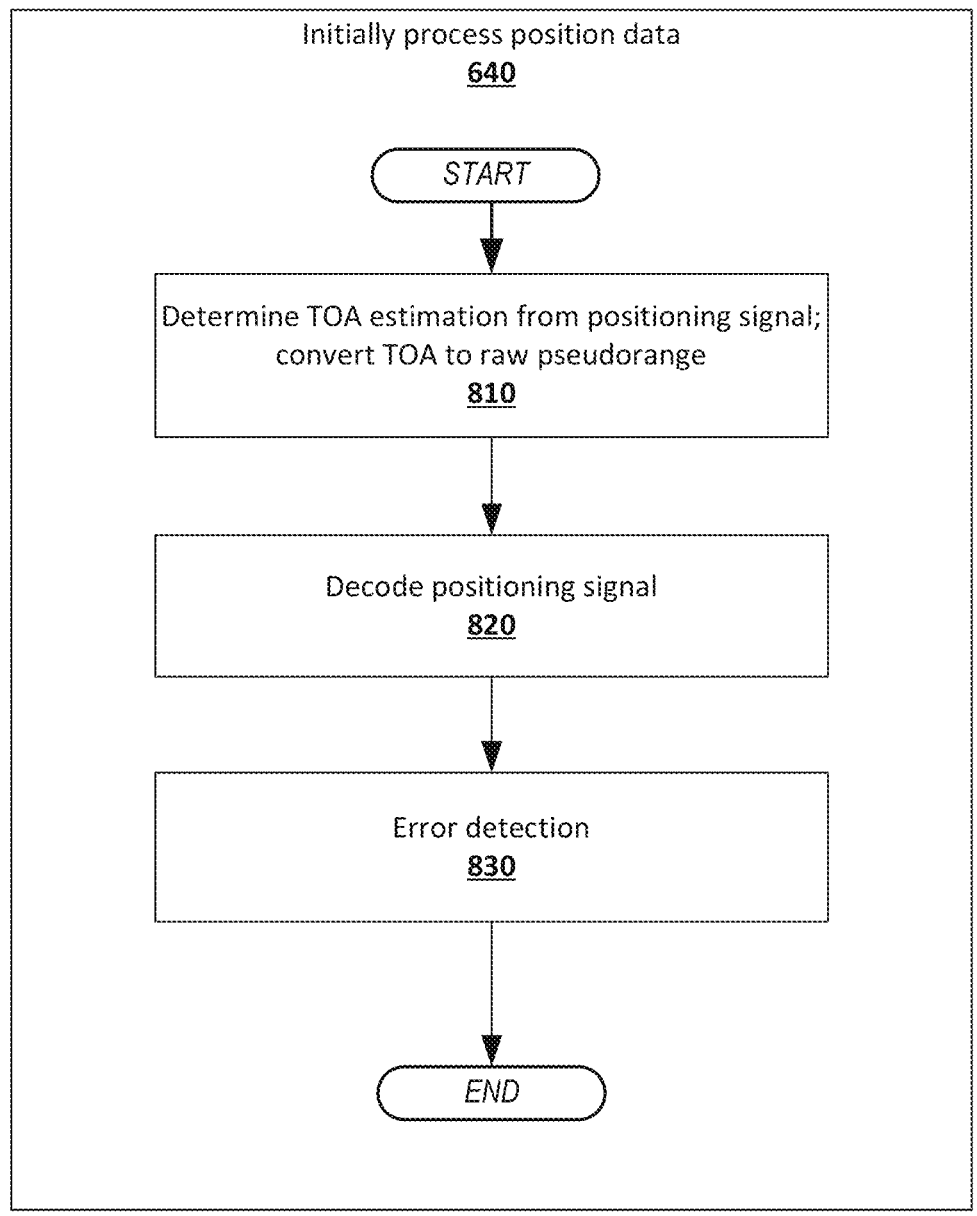
FIG. 8 illustrates a process for processing position information.

At stage 630, an encrypted positioning signal arrives at the receiver from a network. The positioning signal may be broadcasted by a transmitter, or may arrive over other communication pathways (e.g., cellular pathways, web-based pathways, local area network pathways). At stage 640, the receiver initially processes the positioning signal. Sub-stages associated with stage 640 are illustrated in FIG. 8.

At stage 650, the positioning signal arrives at the first cryptography component 422, where it is decrypted using a copy of the ALAC that is stored in memory 430. Then, at stage 660, some or all of the position data from the decrypted positioning signal is decrypted by the second cryptography component 423 using an ASLC associated with the first application. The ASLC may be retrieved from memory 430, or from the network (as described in relation to stage 620 and FIG. 7).

Finally, at stage 670, position engine 440 may receive the decrypted position data along with position TOA or pseudorange information to calculate the receiver's position on behalf of the first application. Calculation of the position may be determined based on a service level indicated by the ASLC for the first application.

FIG. 7 illustrates a diagram detailing a process for provisioning conditional access certificates at a receiver in accordance with certain aspects and stage 620 of FIG. 6. Reference may be made to FIG. 2 while describing the process illustrated in FIG. 7.

At stage 710, the UE 220 retrieves a developer key associated with an application. The developer key may be stored on the UE 220 after the application is downloaded to the UE 220. An association of the developer key and an ASLC may be stored at the network (e.g., the service provider 230, the positioning system 240 or an external entity 250). The ASLC may be specific to not only the application, but also an access level of the UE 220. At stage 720, the developer key is transmitted to the network for processing (e.g., to the service provider 230, the positioning system 240, and/or the developer or application provider 250).

At stage 730, in response to transmitting the developer key, the UE 220/receiver 400 receives an ASLC related to the developer key/application over the network. At stage 740, the ASLC may be stored for future use. Alternatively, the ASLC may not be stored so that stages 710 through 730 are repeated the next time the application requests location information (which requires an ASLC associated with the application, under the two-stage decryption model illustrated in FIG. 6 and described elsewhere herein).

FIG. 8 illustrates a diagram detailing a process for processing positioning signal data in accordance with certain aspects and stage 640 of FIG. 6. Reference may be made to FIG. 4A though FIG. 4C while describing the process illustrated in FIG. 8. By way of example, stage 640 may be performed by signal processing component 421 in FIG. 4A though FIG. 4C.

At stage 810, a positioning signal received from a transmitter through RF component 410 may be used to estimate raw TOA (e.g., at digital processing component 421a). The raw TOA estimate may then be converted to raw positioning pseudorange information at pseudorange generation component 421b.

At stage 820, the positioning signal may be decoded at data processing component 421c. Then, at stage 830, data processing component 421c may perform error detection on the positioning signal data before sending it to the first cryptography component 422 for decryption.

Figure 11:
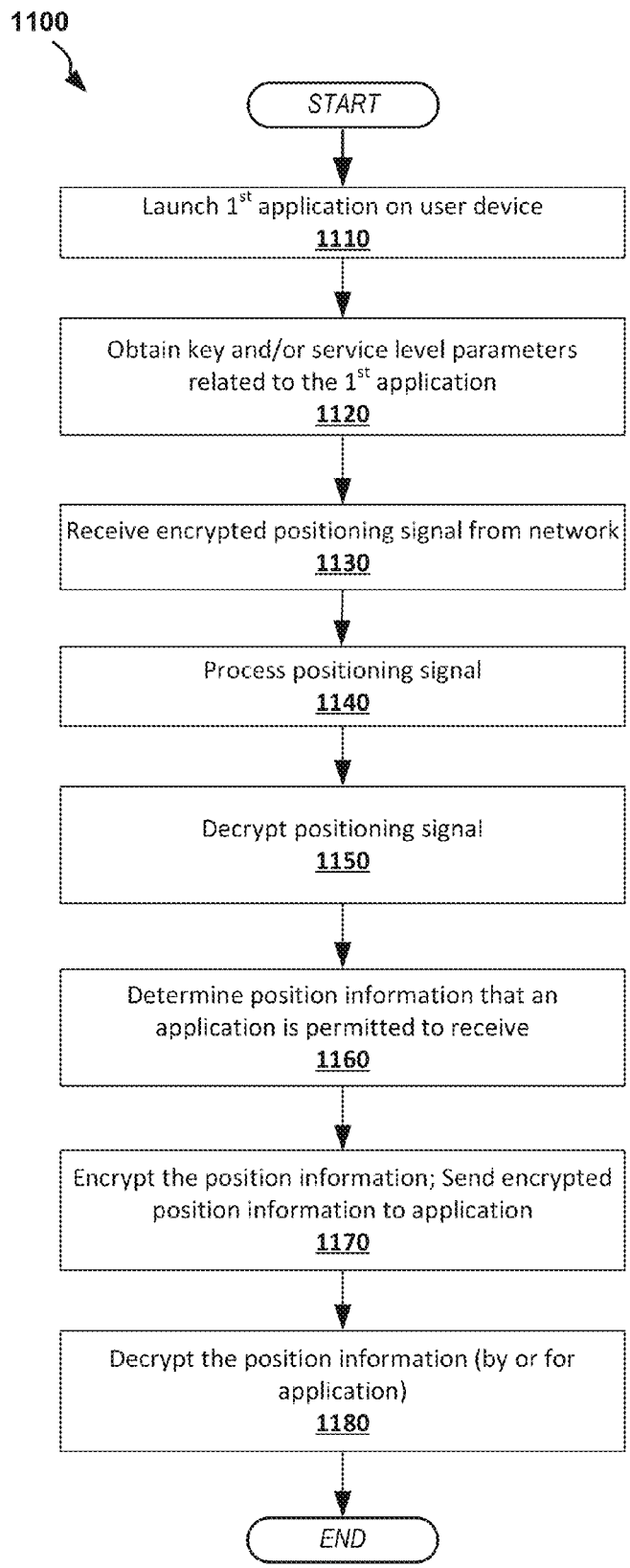
FIG. 11 illustrates a process for providing conditional access to position information at a receiver/user device.

FIG. 11 illustrates a first stage of decryption, a second stage of encryption, and a third stage of decryption. One of skill in the art will appreciate variations in FIG. 11 that stay within the scope and spirit of the disclosure. Certain stages depicted in FIG. 11 may be rearranged or omitted in other implementations. Discussion below relates generally to a receiver. However, the discussion can extend to one or more processors for carrying out some or all of the functionality specified below.

At stage 1110, a first application is launched (e.g., automatically in response to some predefined condition, in response to user input, or in response to another event or circumstance). The application may be launched at a receiver or at a server that is remote from the receiver, among other devices. The receiver may take various forms, including those shown in FIG. 4B though FIG. 4C.

At stage 1120, the receiver obtains a copy of an ASLC associated with the first application. The receiver may obtain the ASLC from memory at the receiver, from the first application, or from an external source. The ASLC may specify parameters that determine what information can be provided to/accessed by the first application, in addition to when and how it can be provided/accessed by the first application, among other conditions. Alternatives to the using the ASLC are contemplated, including using just the data in the ASLC without using a certificate.

At stage 1130, encrypted positioning signals arrive at the receiver from transmitters. Each of the positioning signals may broadcast from respective transmitters, and may arrive over other communication pathways (e.g., cellular pathways, web-based pathways, local area network pathways), or both.

At stage 1140, the receiver initially processes the positioning signals.

At stage 1150, the positioning signal is decrypted using a key (e.g., one specified by an ALAC) stored on the receiver or otherwise accessible by the receiver from an external source.

At stage 1160, the receiver may identify or determine position information from the positioning signals. Such position information may include raw and fine TOA measurements, data units (DUs) described elsewhere herein, estimated position coordinates of a receiver that are computed based on data of the positioning signals, modified position coordinates that are determined based on the estimated position coordinates, or other data. The modified position coordinates may be determined based on the parameters from stage 1120. Such parameters may indicate that an application is permitted to receive position coordinates within a predefined level of accuracy (e.g., a distance) of the estimated position coordinates. In this case, a processor may create new position coordinates based on the level of accuracy (e.g., change the latitude so it falls within a range of x units of measurement from the estimated latitude, change the altitude to 0 so only two dimensions are provided). Providing less accurate position information may enable subscription services on a per-application or per-use basis.

Some or all of the position information may be encrypted at stage 1170 using a key specified by or otherwise generated based on the ASLC or its data from stage 1120. Selection of the position information to encrypt may be controlled by service level conditions specified by the ASLC. Such service level conditions may designate which data can be accessed by the first application, and may be determined from data described elsewhere herein, including some or all of the data described with respect to FIG. 9.

At stage 1180, the encrypted position information is decrypted for use by the first application. A processor running the first application may have knowledge of the key used to encrypt the position information. This knowledge may be gained by having access to the ASLC (e.g., where the ASLC specifies the key or an algorithm for determining the key), or by otherwise receiving the key (e.g., where a session identifier is used).

Aspects Related to Data

FIG. 9 illustrates data for use during a conditional access process in accordance with certain aspects. As shown, data may identify or represent an application type (e.g., E-911, LBS, network management, law enforcement, a UE ID or UE type, a service type (e.g., accuracy of use, use coverage, time of use, data units available), a service provider type, a manufacturer type, a developer type, a user ID or user type, a type of request, or other type of information that may be used as parameters to determine a service level for an application that determines which position information can be provided to the application, when that position information can be provided, how that position information can be provided and where that position can be provided. GPS or other time may also be transmitted to monitor usage based on time limits. Some or all of this data may be incorporated into an ASLC for a particular application and/or UE, and may be later accessed by a processing component to identify position information that can be encrypted before being sent to an application that is local to a receiver or external to (i.e., remote from) the receiver. Each of the data may be used by a processor on the receiver to filter certain decrypted position information before providing that certain position information to the application, a device or a user in encrypted form. In other words, the data determine what position information is available, when it is available, for how long it is available. The ASLC may also include an encryption key or an algorithm for creating an encryption key (e.g., an algorithm for creating an encryption key using real-time data or other data that may be distributed in a protected environment or otherwise made available during encryption and decryption stages).

Timing data received over the air as part of position signals may be used to determine if an ALAC or ASLC are valid when parameters of those certificates specify a period of validity that includes or does not include a time that is indicated by the received timing data.

Service type may relate to accuracy levels in up to three dimensions, including high-range accuracy (e.g., 3 meters), mid-range accuracy (25-50 meters), and low-range accuracy (400 meters). Service type may also relate to coverage levels, including localized, regional, nationwide, and global, among others. Service type may further relate to time of validity levels involving expirations of access privileges in terms of one-time, monthly, yearly, or life-time, among other periods of validity. Service type may also relate to usage levels, including metered and unlimited. Various combinations of these levels may be utilized.

Similar decryption on a location application for non-cellular devices is also contemplated. For example, E-911 calls through VoIP applications (e.g., Skype™) cameras/camcorders, and the like could have ASLCs imaged into their firmware or otherwise downloaded into memory.

Aspects Related to Use Cases

Various types of computing devices and their connectivity states are contemplated, including devices that are nearly always connected, mostly connected, or rarely (if ever connected) to a cellular network, positioning network, local area network, or other network. Additional consideration is given to processing capabilities of each of these computing devices.

Types of connectivity includes cellular (e.g., 3G/4G, pre-paid), Wi-Fi, wired (e.g., USB, Ethernet), and other connectivity.

Types of computing devices include smartphones, other cellular phones, tablets, laptops, connected TVs, VoIP phones, STBs, DMAs, appliances, security systems, PGD, PNDs, DSC, M2M applications, geo-fencing of assets, and others. Connected receivers are devices such as cell phones, tablets and laptops that have an active data pipe available (e.g., Cellular and Wi-Fi/wired Ethernet). Mostly connected receivers are devices such as tablets and laptops that have access to non-cellular means like Wi-Fi/wired Ethernet. Unconnected receivers or receivers with limited connectivity include receivers that are rarely (if ever) connected to the Internet, and have no cellular connectivity It is contemplated that the unconnected receivers may be manufactured with a pre-authorized set of ALACs and ASLCs programmed for the lifetime of the receiver. Key updates beyond this initial period could be delivered either via a firmware update to the device (e.g., using a USB connection) or by connecting the device temporarily to a data network. Such unconnected receivers could determine their location with an appropriate RF receiver that receives the encrypted position information (e.g., a GPS chip).

Additional Aspects

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s). Systems (e.g., apparatuses or components thereof) operable to implement the method(s) are also contemplated.

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s), system(s) or other means may perform the following or be operable to perform the following: decrypt, using a first key, a first set of encrypted position signals received from a network of terrestrial transmitters; determine position information from the first set of decrypted position signals; identify a first set of the position information, wherein the first set of the position information is identified based on a first level of service associated with a first application; encrypt the first set of the position information using a second key; and provide the encrypted first set of the position information to the first application.

In accordance with some aspects, the first set of the position information includes at least one of position coordinates, timing corrections and atmospheric measurements of one or more transmitters from the network of terrestrial transmitters.

By way of example, not by way of limitation, method(s), system(s) or other means may perform the following or be operable to perform the following: compute estimated coordinates of a location of a receiver using the decrypted position signals, wherein the first set of the position information includes the estimated coordinates of the receiver.

In accordance with some aspects, the decrypted position signals include data that specifies atmospheric measurements at each of the terrestrial transmitters, wherein the estimated coordinates include an altitude coordinate that is computed using the decrypted position signals and at least one atmospheric measurement at the receiver.

By way of example, not by way of limitation, method(s), system(s) or other means may perform the following or be operable to perform the following: compute estimated coordinates of a location of a receiver using the decrypted position signals; and compute, based on a level of accuracy permitted for the first application, revised coordinates that are based on the estimated coordinates, wherein the revised coordinates are less accurate than the estimated coordinates in specifying the location of the receiver, and wherein the first set of the position information includes the revised coordinates.

By way of example, not by way of limitation, method(s), system(s) or other means may perform the following or be operable to perform the following: identify a second set of the position information, wherein the second set of the position information is identified based on a second level of service associated with a second application, wherein certain position information included in the first set is not included in the second set; encrypt the second set of the position information using a third key; and provide the second set of the position information to the second application.

By way of example, not by way of limitation, method(s), system(s) or other means may perform the following or be operable to perform the following: decrypt, using the first key or a third key, a second set of encrypted position signals received from the network of terrestrial transmitters, wherein the first set of encrypted position signals are received at a first location of the receiver, and the second set of encrypted position signals are receiver at a second location of the receiver; determine additional position information from the second set of decrypted position signals; identify a second set of the additional position information, wherein the second set of the additional position information is identified based on a second level of service associated with a second application; encrypt the second set of the position information using a fourth key; and provide the second set of the position information to the second application.

By way of example, not by way of limitation, method(s), system(s) or other means may perform the following or be operable to perform the following: determine, prior identifying the first set of the position information, whether information specifying the first level of service is stored on the receiver; upon determining that the information specifying the first level of service is not stored on the receiver, access a first developer key that is associated with the first application; send the first developer key to a server; and receive the information specifying the first level of service in response to sending the first developer key to the server.

In accordance with some aspects, the information specifying the first level of service is included in a first authorized service-level certificate associated with the first application, and wherein the certificate is associated with the developer key.

In accordance with some aspects, the first level of service specifies a time period during which the second key can be used to encrypt the first set of the position information and any subsequent sets of any subsequent position information.

In accordance with some aspects, the second key is a session key that is generated after the position signals are decrypted.

In accordance with some aspects, first application runs on a remote server, and the first set of the position information is provided to the remote server.

By way of example, not by way of limitation, method(s), system(s) or other means may perform the following or be operable to perform the following: determine the first level of service based on parameters that are specified in a first certificate associated with the first application.

By way of example, not by way of limitation, method(s), system(s) or other means may perform the following or be operable to perform the following: scramble the position information before the position information is sent through an unprotected communication pathway; and unscramble the scrambled position information before identifying the first set.

By way of example, not by way of limitation, method(s), system(s) or other means may perform the following or be operable to perform the following: scramble the estimated coordinates before the estimated coordinates are sent through an unprotected communication pathway; and unscramble the scrambled estimated coordinates before encrypting the first set.

By way of example, not by way of limitation, method(s), system(s) or other means may perform the following or be operable to perform the following: select the first key from among a plurality of keys, wherein a CRC field of the encrypted position signals passes check only when the first key is used to decrypt the first set of encrypted position signals.

By way of example, not by way of limitation, method(s), system(s) or other means may perform the following or be operable to perform the following: select the first key from among a plurality of keys, wherein data of the decrypted position signals matches an expected value only when the first key is used to decrypt the first set of encrypted position signals.

By way of example, not by way of limitation, method(s), system(s) or other means may perform the following or be operable to perform the following: select the first key from among a plurality of keys, wherein the packet data from the multiple transmitters pass one or more coherency checks only when the first key is used to decrypt the first set of encrypted position signals, where the first set of encrypted position signals includes packet data from multiple transmitters.

Other Aspects

Additional disclosure regarding various features of disclosure are described in the following co-assigned patent applications which are incorporated by reference in their entirety for any and all purposes: U.S. Utility patent application Ser. No. 13/412,487, entitled WIDE AREA POSITIONING SYSTEMS, filed on Mar. 5, 2012 (pub no. US 2013-0120188 A1, published May 16, 2013); U.S. Utility patent Ser. No. 12/557,479 (now U.S. Pat. No. 8,130,141), entitled WIDE AREA POSITIONING SYSTEM, filed Sep. 10, 2009; U.S. Utility patent application Ser. No. 13/412,508, entitled WIDE AREA POSITIONING SYSTEM, filed Mar. 5, 2012 (pub no. US 2013-0063301 A1, published Mar. 14, 2013); U.S. Utility patent application Ser. No. 13/296,067, entitled WIDE AREA POSITIONING SYSTEMS, filed Nov. 14, 2011 (pub no. US 2012-0182180 A1, published Jul. 19, 2012); Application Ser. No. PCT/US12/44452, entitled WIDE AREA POSITIONING SYSTEMS, filed Jun. 28, 2011 (pub no. WO 2013/003492, published Jan. 3, 2013); U.S. patent application Ser. No. 13/535,626, entitled CODING IN WIDE AREA POSITIONING SYSTEMS, filed Jun. 28, 2012 (pub no. US 2013-0057436 A1, published Mar. 7, 2013); U.S. patent application Ser. No. 13/536,051, entitled CODING IN WIDE AREA POSITIONING SYSTEM (WAPS), filed Jun. 28, 2012 (pub no. US 2013-0063302 A1, published Mar. 14, 2013); U.S. patent application Ser. No. 13/565,614, entitled CELL ORGANIZATION AND TRANSMISSION SCHEMES IN A WIDE AREA POSITIONING SYSTEM (WAPS), filed Aug. 2, 2012 (pub no. US 2013-0057434 A1, published Mar. 7, 2013); U.S. patent application Ser. No. 13/565,732, entitled CELL ORGANIZATION AND TRANSMISSION SCHEMES IN A WIDE AREA POSITIONING SYSTEM, filed Aug. 2, 2012 (pub no. US 2013-0063307 A1, published Mar. 14, 2013); U.S. patent application Ser. No. 13/565,723, entitled CELL ORGANIZATION AND TRANSMISSION SCHEMES IN A WIDE AREA POSITIONING SYSTEM, filed Aug. 2, 2012 (pub no. US 2013-0063308 A1, published Mar. 14, 2013); U.S. patent application Ser. No. 13/831,740, entitled SYSTEMS AND METHODS CONFIGURED TO ESTIMATE RECEIVER POSITION USING TIMING DATA ASSOCIATED WITH REFERENCE LOCATIONS IN THREE-DIMENSIONAL SPACE, filed Mar. 14, 2013; U.S. patent application Ser. No. 13/909,977, entitled SYSTEMS AND METHODS FOR LOCATION POSITIONING of USER DEVICE, filed Jun. 4, 2013; U.S. patent application Ser. No. 14/010,437, entitled SYSTEMS AND METHODS FOR PROVIDING CONDITIONAL ACCESS TO TRANSMITTED INFORMATION, filed Aug. 26, 2013; U.S. patent application Ser. No. 14/011,277, entitled METHODS AND APPARATUS FOR PSEUDO-RANDOM CODING IN A WIDE AREA POSITIONING SYSTEM (WAPS), filed Aug. 27, 2013. The above applications, publications and patents may be individually or collectively referred to herein as "incorporated reference(s)", "incorporated application(s)", "incorporated publication(s)", "incorporated patent(s)" or otherwise designated. The various aspect, details, devices, systems, and methods disclosed herein may be combined with disclosures in any of the incorporated references.

It is noted that the term "GPS" may refer to any Global Navigation Satellite Systems (GNSS), such as GLONASS, Galileo, and Compass/Beidou, and vice versa.

Certain aspects disclosed herein relate to a positioning system that estimates the positions of things—e.g., where the position is represented in terms of: latitude, longitude, and/or altitude coordinates; x, y, and/or z coordinates; angular coordinates; or other representations. Positioning systems use various techniques to estimate the position of an thing (e.g., a receiver), including trilateration, which is the process of using geometry to estimate the position using distances traveled by different "ranging" or "positioning" signals that are received by the receiver from different beacons (e.g., transmitters, satellites, antennas). If the transmission time and reception time of a ranging signal are known, then the difference between those times multiplied by speed of light would provide an estimate of the distance traveled by that ranging signal. These estimates of distance are often referred to as "range" measurements. When errors in the measured time(s) are present, a "range" measurement is typically referred to as a "pseudorange" measurement. Thus, a "pseudorange" measurement is a type of "range" measurement. Positioning systems and methods that estimate a position of a receiver based on signaling from beacons (e.g., transmitters, and/or satellites) are described in co-assigned U.S. Pat. No. 8,130,141, issued Mar. 6, 2012, and U.S. patent application Ser. No. 13/296,067, filed Nov. 14, 2011.

Various architectures of GPS receivers are contemplated. For example, a GPS receiver's logical functions can be split into two sections: (1) signal processing and (2) position computation. The signal processing functions may be implemented in hardware and the position computation may be implemented in firmware/software. These functions may be carried out on a GPS "chip" having DSP hardware blocks and an ARM-processor subsystem that manages the DSP hardware and computes the position. Such GPS chips typically produce the final Latitude, Longitude and Altitude in the form of NMEA messages. Alternatively, position computation may be carried out on an apps processor resident on a handset to add additional location information and build a comprehensive position solution. The disclosure herein may apply to both implementations (in addition to other configurations for processing signals and computing position).

The various illustrative systems, methods, logical features, blocks, modules, components, circuits, and algorithm steps described herein may be implemented, performed, or otherwise controlled by suitable hardware known or later developed in the art, or by software executed by a processor (also referred to as a "processing device" and also inclusive of any number of processors), or by both. Software may be downloadable and non-downloadable at a particular system. Such software, once loaded on a machine, changes the operation of that machine. Software may reside in RAM memory, flash memory, ROM memory, EPROM memory, EEPROM memory, registers, hard disk, a removable disk, a CD-ROM, or any other form of storage medium.

Systems on which methods described herein are performed may include one or more means that implement those methods. For example, such means may include processor(s) or other hardware that, when executing instructions (e.g., embodied in software or firmware), perform any method step disclosed herein. A processor may perform or cause any of the processing, computational, method steps, or other system functionality relating to the processes/methodologies and systems disclosed herein, including analysis, manipulation, conversion or creation of data, or other operations on data.

A processor may include, or be included within, a computer or computing device, a controller, an integrated circuit, a "chip", a system on a chip, a server, other programmable logic devices, other circuitry, or any combination thereof. It is noted that the terms "computer" or "computing device" or "user device" or the like may refer to devices that include a processor, or may refer to the processor itself. A processor may include a general purpose processor, a digital signal processor (DSP), an application specific integrated circuit (ASIC), a state machine, a controller, a field programmable gate array (FPGA), other programmable logic device, discrete gate or transistor logic, discrete hardware components, server, or any combination thereof. The term "processor" may refer to one, two or more processors of the same or different types. Aspects may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

All of the information disclosed herein may be represented by data, and that data may be transmitted over any communication pathway using any protocol, stored on data source(s), and processed by a processor (also referred to as a "processing device"). Transmission of data may be carried out using a variety of wires, cables, radio signals and infrared light beams, and an even greater variety of connectors, plugs and protocols even if not shown or explicitly described. Systems may exchange information with each other using any communication technology. Data, instructions, commands, information, signals, bits, symbols, and chips and the like may be represented by voltages, currents, electromagnetic waves, magnetic fields or particles, or optical fields or particles. "Data" and "information" may be used interchangeably. Application programs may carry out aspects by receiving, converting, processing, storing, retrieving, transferring and/or exporting data, which may be stored in a hierarchical, network, relational, non-relational, object-oriented, or other data source.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

The terms "module," "block," "feature," or "component" may refer to hardware or software, or a combination of both hardware and software, that is configured to carry out or otherwise achieve the functionality associated with those modules, blocks, features or components. Similarly, features in system and apparatus figures that are illustrated as rectangles may refer to hardware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. When two things like modules (e.g., groups of components), individual components are "coupled to" each other, those two things may be directly connected together, or may be separated by one or more intervening things. Thus, no direct connection is required between the two things. Where an output and an input are coupled to each other, data and/or signaling sent from the output is received by the input even if the data passes through one or more intermediate things.

RELATED APPLICATIONS

This application relates to U.S. patent application Ser. No. 14/023,427, filed Sep. 10, 2013, entitled SYSTEMS AND METHODS FOR PROVIDING CONDITIONAL ACCESS TO TRANSMITTED INFORMATION, U.S. patent application Ser. No. 14/010,437, filed Aug. 26, 2013, entitled SYSTEMS AND METHODS FOR PROVIDING CONDITIONAL ACCESS TO TRANSMITTED INFORMATION, and U.S. Patent Application No. 61/699,800, filed Sep. 11, 2012, entitled SYSTEMS AND METHODS FOR PROVIDING CONDITIONAL ACCESS TO TRANSMITTED INFORMATION, the contents of which are hereby incorporated by reference herein in their entirety.

The invention claimed is:

1. A system for controlling access to encrypted data received from a transmitter network, and for controlling access to different estimates of a receiver's position by one or more applications, the system comprising:
a processor;
a first cryptography component; and
a second cryptography component,
wherein the first cryptography component is operable to decrypt, using a first key, encrypted data retrieved from one or more signals that were transmitted by a terrestrial transmitter,
wherein the encrypted data includes data representing the terrestrial transmitter's position coordinates, and further includes data representing an atmospheric measurement that was measured at the terrestrial transmitter,
wherein the processor is operable to determine an estimate of a receiver's position using (i) an atmospheric measurement from a sensor of the receiver and (ii) the decrypted data representing the terrestrial transmitter's position coordinates and representing the atmospheric measurement that was measured at the terrestrial transmitter,
wherein the estimate of the receiver's position includes an estimated latitude, an estimated longitude, and an estimated altitude of the receiver's position, and
wherein the second cryptography component is operable to encrypt, using a second key associated with a first application, a first set of coordinates from the estimated latitude, the estimated longitude, and the estimated altitude that the first application is permitted to receive.

2. The system of claim 1, wherein the first set of coordinates does not include at least one of the estimated latitude, the estimated longitude, or the estimated altitude.

3. The system of claim 1, wherein the second cryptography component is operable to encrypt, using a third key associated with a second application, a second set of coordinates from the estimated latitude, the estimated longitude, and the estimated altitude that the second application is permitted to receive, and wherein the second set of coordinates and the first set of coordinates are different.

4. The system of claim 1, wherein:
the first cryptography component is operable to decrypt, using the first key or another key, additional encrypted data retrieved from one or more additional signals that were received from the terrestrial transmitter or another terrestrial transmitter when the receiver is at a different location;
the processor is operable to determine an estimate of the receiver's different position using the additional data that was decrypted by the first cryptography component;
the estimate of the receiver's different position includes a different estimated latitude, a different estimated longitude, and a different estimated altitude of the receiver's different position;
the second cryptography component is operable to encrypt, using a third key associated with a second application, a second set of coordinates from the different estimated latitude, the different estimated longitude, and the different estimated altitude that the second application is permitted to receive; and the number of coordinates in the first set of coordinates is different than the number of coordinates in the second set of coordinates.

5. The system of claim 1, wherein processor is operable to:
   determine, prior to encrypting the first set of coordinates, whether information specifying a first level of service that the first application is permitted to receive is stored at the receiver,
   after determining that the information specifying the first level of service is not stored at the receiver, send a first developer key that is associated with the first application to a server; and
   receive the information specifying the first level of service from the server after sending the first developer key to the server.

6. The system of claim 1, wherein the processor is operable to determine the first set of coordinates that the first application is permitted to receive using a first level of service that specifies a time period during which the second key can be used to encrypt the first set of coordinates.

7. The system of claim 1, further comprising:
   a data scrambling component, an unprotected communication pathway, and a data descrambling component located between the first cryptography component and the processor, wherein:
      the data scrambling component is operable to scramble the decrypted data and to send the scrambled decrypted data to the unprotected communication pathway,
      the data descrambling component is operable to receive the scrambled decrypted data from the unprotected communication pathway and to unscramble the scrambled decrypted data, and
      the processor is operable to determine the estimate of the receiver's position using the unscrambled decrypted data.

8. A system for controlling access to encrypted data received from a transmitter network, and for controlling access to different estimates of a receiver's position by one or more applications, the system comprising:
   a processor;
   a first cryptography component; and
   a second cryptography component,
   wherein the first cryptography component is operable to decrypt, using a first key, encrypted data retrieved from one or more signals that were transmitted by a terrestrial transmitter,
   wherein the processor is operable to determine a first estimate of a receiver's position using the data that was decrypted by the first cryptography component, and
   wherein the second cryptography component is operable to encrypt, using a second key associated with a first application, a revised estimate of the receiver's position that is less accurate than the first estimate of the receiver's position, and that is generated using the first estimate of the receiver's position and a first level of accuracy permitted for the first application.

9. The system of claim 8, wherein the first estimate of the receiver's position includes a first set of estimated coordinates of the receiver's position, and wherein the revised estimate of the receiver's position includes a revised set of estimated coordinates of the receiver's position that are less accurate than the first set of estimated coordinates.

10. The system of claim 8, wherein the second cryptography component is operable to encrypt, using a third key associated with a second application, an additional estimate of the receiver's position that is less accurate than the first estimate of the receiver's position, and that is generated using the first estimate of the receiver's position and a second level of accuracy permitted for the second application that is different than the first level of accuracy permitted for the first application.

11. The system of claim 8, wherein:
    the first cryptography component is operable to decrypt, using the first key or another key, additional encrypted data retrieved from one or more additional signals that were received from the terrestrial transmitter or another terrestrial transmitter when the receiver is at a different location;
    the processor is operable to determine a first estimate of the receiver's different position using the additional data that was decrypted by the first cryptography components; and
    the second cryptography component is operable to encrypt, using a third key associated with a second application, a revised estimate of the receiver's different position that is less accurate than the first estimate of the receiver's different position, and that is generated using the first estimate of the receiver's different position and a second level of accuracy permitted for the second application that is different than the first level of accuracy permitted for the first application.

12. The system of claim 8, wherein the processor is operable to:
    determine, prior to encrypting the revised estimate of the receiver's position, whether information specifying the first level of accuracy permitted for the first application is stored at the receivers;
    after determining that the information specifying the first level of accuracy permit led for the first application is not stored at the receiver, send a first developer key that is associated with the first application to a server; and
    receive the information specifying the first level of accuracy from the server after sending the first developer key to the server.

13. The system of claim 8, wherein the first level of accuracy permitted for the first application indicates that the revised estimate of the receiver's position needs to be within a predefined distance of the first estimate of the receiver's position.

14. The system of claim 8, further comprising:
    a data scrambling component, an unprotected communication pathway, and a data descrambling component located between the first cryptography component and the processor, wherein:
       the data scrambling component is operable to scramble the decrypted data and to send the scrambled decrypted data to the unprotected communication pathway,
       the data descrambling component is operable to receive the scrambled decrypted data from the unprotected communication pathway and to unscramble the scrambled decrypted data, and
       the processor is operable to determine the first estimate of the receiver's position using the unscrambled data.

15. A method for controlling access to encrypted data received from a transmitter network, and for controlling access to different estimates of a receiver's position by one or more applications, the method comprising:

decrypting, using a first key, encrypted data retrieved from one or more signals that were transmitted by a terrestrial transmitter;

determining a first estimate of a receiver's position using the data that was decrypted; and encrypting, using a second key associated with a first application, a revised estimate of the receiver's position that is less accurate than the first estimate of the receiver's position, and that is generated using the first estimate of the receiver's position and a first level of accuracy permitted for the first application.

16. The method of claim 15, wherein the first estimate of the receiver's position includes a first set of estimated coordinates of the receiver's position, and wherein the revised estimate of the receiver's position includes a revised set of estimated coordinates of the receiver's position that are less accurate than the first set of estimated coordinates.

17. The method of claim 15, the method comprising:
encrypting, using a third key associated with a second application, an additional estimate of the receiver's position that is less accurate than the first estimate of the receiver's position, and that is generated using the first estimate of the receiver's position and a second level of accuracy permitted for the second application that is different than the first level of accuracy permitted for the first application.

18. The method of claim 15, the method comprising:
decrypting, using the first key or another key, additional encrypted data retrieved from one or more additional signals that were received from the terrestrial transmitter or another terrestrial transmitter when the receiver is at a different location;

determining a first estimate of the receiver's different position using the additional data that was decrypted; and encrypting, using a third key associated with a second application, a revised estimate of the receiver's different position that is less accurate than the first estimate of the receiver's different position, and that is generated using the first estimate of the receiver's different position and a second level of accuracy permitted for the second application that is different than the first level of accuracy permitted for the first application.

19. The method of claim 15, the method comprising:
determining, prior to encrypting the revised estimate of the receiver's position, whether information specifying the first level of accuracy permitted for the first application is stored at the receiver;

after determining that the information specifying the first level of accuracy permitted for the first application is not stored at the receiver, sending a first developer key that is associated with the first application to a server; and receiving the information specifying the first level of accuracy from the server after sending the first developer key to the server.

20. The method of claim 15, wherein the first level of accuracy permitted for the first application indicates that the revised estimate of the receiver's position needs to be within a predefined distance of the first estimate of the receiver's position.

21. The method of claim 15, the method comprising:
scrambling the decrypted data;
sending the scrambled decrypted data to an unprotected communication pathway;
receiving the scrambled decrypted data from the unprotected communication pathway; and unscrambling the scrambled decrypted data,
wherein the first estimate of the receiver's position is determined using the unscrambled decrypted data.

22. A method for controlling access to encrypted data received from a transmitter network, and for controlling access to different estimates of a receiver's position by one or more applications, the method comprising:

decrypting, using a first key, encrypted data retrieved from one or more signals that were transmitted by a terrestrial transmitter, wherein the encrypted data includes data representing the terrestrial transmitter's position coordinates, and further includes data representing an atmospheric measurement that was measured at the terrestrial transmitter;

determining an estimate of a receiver's position using (i) an atmospheric measurement from a sensor of the receiver and (ii) the decrypted data representing the terrestrial transmitter's position coordinates and representing the atmospheric measurement that was measured at the terrestrial transmitter, wherein the estimate of the receiver's position includes an estimated latitude, an estimated longitude, and an estimated altitude of the receiver's position; and encrypting, using a second key associated with a first application, a first set of coordinates from the estimated latitude, the estimated longitude, and the estimated altitude that the first application is permitted to receive.

23. The method of claim 22, wherein the first set of coordinates does not include at least one of the estimated latitude, the estimated longitude, or the estimated altitude.

24. The method of claim 22, the method comprising:
encrypting, using a third key associated with a second application, a second set of coordinates from the estimated latitude, the estimated longitude, and the estimated altitude that the second application is permitted to receive,
wherein the second set of coordinates and the first set of coordinates are different.

25. The method of claim 22, the method comprising:
decrypting, using the first key or another key, additional encrypted data retrieved from one or more additional signals that were received from the terrestrial transmitter or another terrestrial transmitter when the receiver is at a different location;

determining an estimate of the receiver's different position using the additional data that was decrypted, wherein the estimate of the receiver's different position includes a different estimated latitude, a different estimated longitude, and a different estimated altitude of the receiver's different position; and encrypting, using a third key associated with a second application, a second set of coordinates from the different estimated latitude, the different estimated longitude, and the different estimated altitude that the second application is permitted to receive, wherein the number of coordinates in the first set of coordinates is different than the number of coordinates in the second set of coordinates.

26. The method of claim 22, the method comprising:
determining, prior to encrypting the first set of coordinates, whether information specifying a first level of service that the first application is permitted to receive is stored at the receiver;

after determining that the information specifying the first level of service is not stored at the receiver, sending a first developer key that is associated with the first application to a server; and receiving the information specifying the first level of service from the server after sending the first developer key to the server.

27. The method of claim 22, wherein the first set of coordinates that the first application is permitted to receive are determined using a first level of service that specifies a time period during which the second key can be used to encrypt the first set of coordinates.

28. The method of claim 22, the method comprising:
scrambling the decrypted data;
sending the scrambled decrypted data to an unprotected communication pathway,
receiving the scrambled decrypted data from the unprotected communication pathway; and
unscrambling the scrambled decrypted data,
wherein the estimate of the receiver's position is determined using the unscrambled decrypted data.

29. One or more non-transitory processor-readable media embodying program instructions that, when executed by one or more processors, cause the one or more processors to perform a method for controlling access to encrypted data received from a transmitter network, and for controlling access to different estimates of a receiver's position by one or more applications, the method comprising:
decrypting, using a first key, encrypted data retrieved from one or more signals that were transmitted by a terrestrial transmitter;
determining a first estimate of a receiver's position using the data that was decrypted; and
encrypting, using a second key associated with a first application, a revised estimate of the receiver's position that is less accurate than the first estimate of the receiver's position, and that is generated using the first estimate of the receiver's position and a first level of accuracy permitted for the first application.

30. The one or more non-transitory processor-readable media of claim 29, wherein the first estimate of the receiver's position includes a first set of estimated coordinates of the receiver's position, and wherein the revised estimate of the receiver's position includes a revised set of estimated coordinates of the receiver's position that are less accurate than the first set of estimated coordinates.

31. The one or more non-transitory processor-readable media of claim 29, the method comprising:
encrypting, using a third key associated with a second application, an additional estimate of the receiver's position that is less accurate than the first estimate of the receiver's position, and that is generated using the first estimate of the receiver's position and a second level of accuracy permitted for the second application that is different than the first level of accuracy permitted for the first application.

32. The one or more non-transitory processor-readable media of claim 29, the method comprising:
decrypting, using the first key or another key, additional encrypted data retrieved from one or more additional signals that were received from the terrestrial transmitter or another terrestrial transmitter when the receiver is at a different location;
determining a first estimate of the receiver's different position using the additional data that was decrypted; and
encrypting, using a third key associated with a second application, a revised estimate of the receiver's different position that is less accurate than the first estimate of the receiver's different position, and that is generated using the first estimate of the receiver's different position and a second level of accuracy permitted for the second application that is different than the first level of accuracy permitted for the first application.

33. The one or more non-transitory processor-readable media of claim 29, the method comprising:
determining, prior to encrypting the revised estimate of the receiver's position, whether information specifying the first level of accuracy permitted for the first application is stored at the receiver;
after determining that the information specifying the first level of accuracy permitted for the first application is not stored at the receiver, sending a first developer key that is associated with the first application to a server; and
receiving the information specifying the first level of accuracy from the server after sending the first developer key to the server.

34. The one or more non-transitory processor-readable media of claim 29, wherein the first level of accuracy permitted for the first application indicates that the revised estimate of the receiver's position needs to be within a predefined distance of the first estimate of the receiver's position.

35. The one or more non-transitory processor-readable media of claim 29, the method comprising:
scrambling the decrypted data;
sending the scrambled decrypted data to an unprotected communication pathway,
receiving the scrambled decrypted data from the unprotected communication pathway; and
unscrambling the scrambled decrypted data,
wherein the first estimate of the receiver's position is determined using the unscrambled decrypted data.

36. One or more non-transitory processor-readable media embodying program instructions that, when executed by one or more processors, cause the one or more processors to perform a method for controlling access to encrypted data received from a transmitter network, and for controlling access to different estimates of a receiver's position by one or more applications, the method comprising:
decrypting, using a first key, encrypted data retrieved from one or more signals that were transmitted by a terrestrial transmitter,
wherein the encrypted data includes data representing the terrestrial transmitter's position coordinates, and further includes data representing an atmospheric measurement that was measured at the terrestrial transmitter;
determining an estimate of a receiver's position using (i) an atmospheric measurement from a sensor of the receiver and (ii) the decrypted data representing the terrestrial transmitter's position coordinates and representing the atmospheric measurement that was measured at the terrestrial transmitter,
wherein the estimate of the receiver's position includes an estimated latitude, an estimated longitude, and an estimated altitude of the receiver's position; and
encrypting, using a second key associated with a first application, a first set of coordinates from the estimated latitude, the estimated longitude, and the estimated altitude that the first application is permitted to receive.

37. The one or more non-transitory processor-readable media of claim 36, wherein the first set of coordinates does not include at least one of the estimated latitude, the estimated longitude, or the estimated altitude.

38. The one or more non-transitory processor-readable media of claim 36, the method comprising:
  encrypting, using a third key associated with a second application, a second set of coordinates from the estimated latitude, the estimated longitude, and the estimated altitude that the second application is permitted to receive,
  wherein the second set of coordinates and the first set of coordinates are different.

39. The one or more non-transitory processor-readable media of claim 36, the method comprising:
  decrypting, using the first key or another key, additional encrypted data retrieved from one or more additional signals that were received from the terrestrial transmitter or another terrestrial transmitter when the receiver is at a different location;
  determining an estimate of the receiver's different position using the additional data that was decrypted,
  wherein the estimate of the receiver's different position includes a different estimated latitude, a different estimated longitude, and a different estimated altitude of the receiver's different position; and
  encrypting, using a third key associated with a second application, a second set of coordinates from the different estimated latitude, the different estimated longitude, and the different estimated altitude that the second application is permitted to receive,
  wherein the number of coordinates in the first set of coordinates is different than the number of coordinates in the second set of coordinates.

40. The one or more non-transitory processor-readable media of claim 36, to the method comprising:
  determining, prior to encrypting the first set of coordinates, whether information specifying a first level of service that the first application is permitted to receive is stored at the receiver;
  after determining that the information specifying the first level of service is not stored at the receiver, sending a first developer key that is associated with the first application to a server; and
  receiving the information specifying the first level of service from the server after sending the first developer key to the server.

41. The one or more non-transitory processor-readable media of claim 36, wherein the first set of coordinates that the first application is permitted to receive are determined using a first level of service that specifies a time period during which the second key can be used to encrypt the first set of coordinates.

42. The one or more non-transitory processor-readable media of claim 36, the method comprising:
  scrambling the decrypted data;
  sending the scrambled decrypted data to an unprotected communication pathway,
  receiving the scrambled decrypted data from the unprotected communication pathway; and
  unscrambling the scrambled decrypted data,
  wherein the estimate of the receiver's position is determined using the unscrambled decrypted data.

* * * * *